(12) United States Patent
Bai

(10) Patent No.: US 12,739,505 B2
(45) Date of Patent: Sep. 15, 2026

(54) IMAGE READOUT MODE SWITCHING METHOD AND RELATED DEVICE

(71) Applicant: Honor Device Co., Ltd., Shenzhen (CN)

(72) Inventor: Chunyu Bai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/993,354

(22) PCT Filed: Sep. 7, 2023

(86) PCT No.: PCT/CN2023/117483
§ 371 (c)(1),
(2) Date: Jan. 10, 2025

(87) PCT Pub. No.: WO2024/093518
PCT Pub. Date: May 10, 2024

(65) Prior Publication Data

US 2026/0019702 A1 Jan. 15, 2026

(30) Foreign Application Priority Data

Nov. 1, 2022 (CN) ......................... 202211356362.5

(51) Int. Cl.
*H04N 23/667* (2023.01)
*G06F 9/445* (2018.01)
(Continued)

(52) U.S. Cl.
CPC ....... *H04N 23/667* (2023.01); *G06F 9/44505* (2013.01); *G06F 9/45504* (2013.01);
(Continued)

(58) Field of Classification Search
None
See application file for complete search history.

(56) References Cited

U.S. PATENT DOCUMENTS 11,057,572 B1* 7/2021 Wang ..................... H04N 23/58
2018/0205886 A1* 7/2018 Lee ........................ H04N 25/42
(Continued)

FOREIGN PATENT DOCUMENTS

CN 105430276 A 3/2016
CN 113315913 A 8/2021
(Continued)

*Primary Examiner* — Paul M Berardesca
(74) *Attorney, Agent, or Firm* — Conley Rose, P.C.

(57) ABSTRACT

An image readout mode switching method and a related device. According to the method, an electronic device collects an image based on a first image readout mode in a first camera mode, switches, in a case that a switching condition for switching from the first image readout mode to a second image readout mode is satisfied, a configuration parameter of a currently applied image readout mode from a configuration parameter of the first image readout mode to a configuration parameter of the second image readout mode based on a corresponding mode switching configuration parameter, and acquire an image based on the second image readout mode in the first camera mode. The configuration parameter of the second image readout mode is a configuration parameter that is preloaded before switching to the second image readout mode is determined.

20 Claims, 18 Drawing Sheets

(51) Int. Cl.

| | |
|---|---|
| ***G06F 9/455*** | (2018.01) |
| ***H04N 23/60*** | (2023.01) |
| ***H04N 23/62*** | (2023.01) |
| ***H04N 23/63*** | (2023.01) |
| ***H04N 23/69*** | (2023.01) |
| ***H04N 23/741*** | (2023.01) |

(52) U.S. Cl.

CPC ........... *H04N 23/62* (2023.01); *H04N 23/632* (2023.01); *H04N 23/633* (2023.01); *H04N 23/665* (2023.01); *H04N 23/69* (2023.01); *H04N 23/741* (2023.01)

(56) References Cited

U.S. PATENT DOCUMENTS

| | | | | |
|---|---|---|---|---|
| 2020/0059597 | A1* | 2/2020 | Chen | H04N 23/64 |
| 2020/0221024 | A1* | 7/2020 | Lee | G06T 1/20 |
| 2021/0067749 | A1 | 3/2021 | Yadav et al. | |
| 2024/0284045 | A1 | 8/2024 | Zhang et al. | |

FOREIGN PATENT DOCUMENTS

| | | | | | |
|---|---|---|---|---|---|
| CN | 113347334 | A | | 9/2021 | |
| CN | 113727016 | A | | 11/2021 | |
| CN | 114007011 | A | | 2/2022 | |
| CN | 115550541 | A | | 12/2022 | |
| CN | 116567407 | A | | 8/2023 | |
| KR | 20230010461 | A | * | 1/2023 | H04N 23/667 |

* cited by examiner

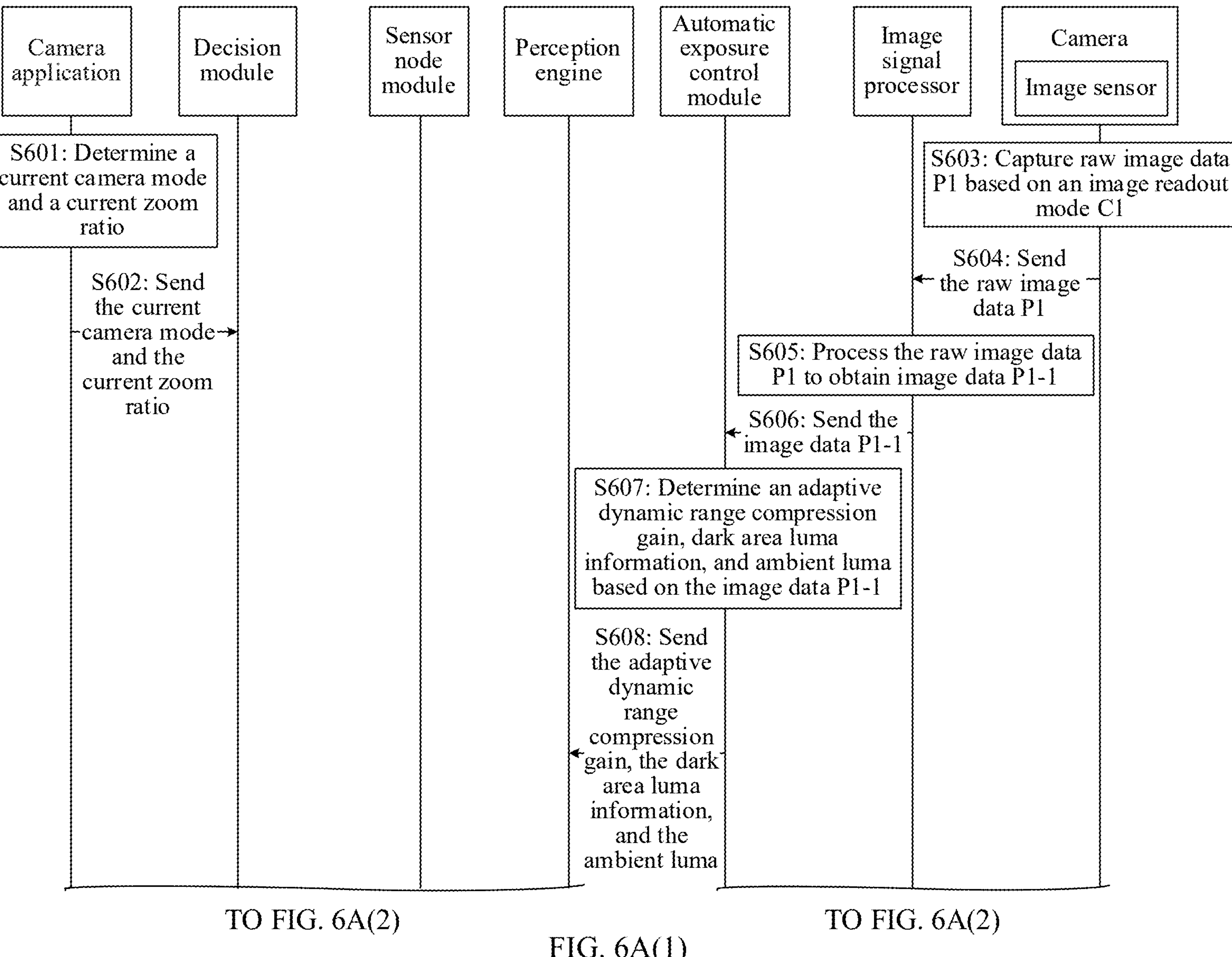
FIG. 6A(1)

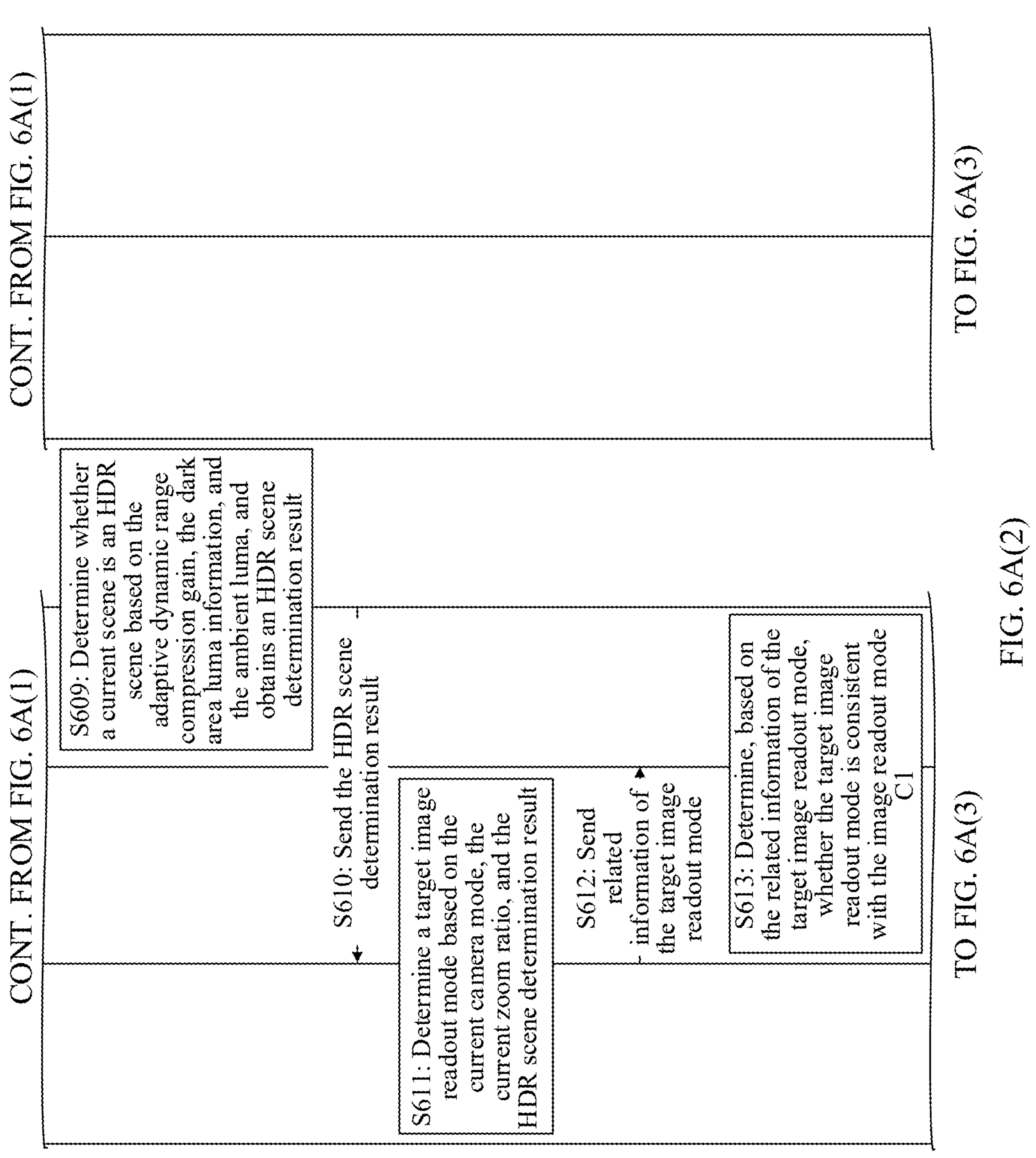
FIG. 6A(2)

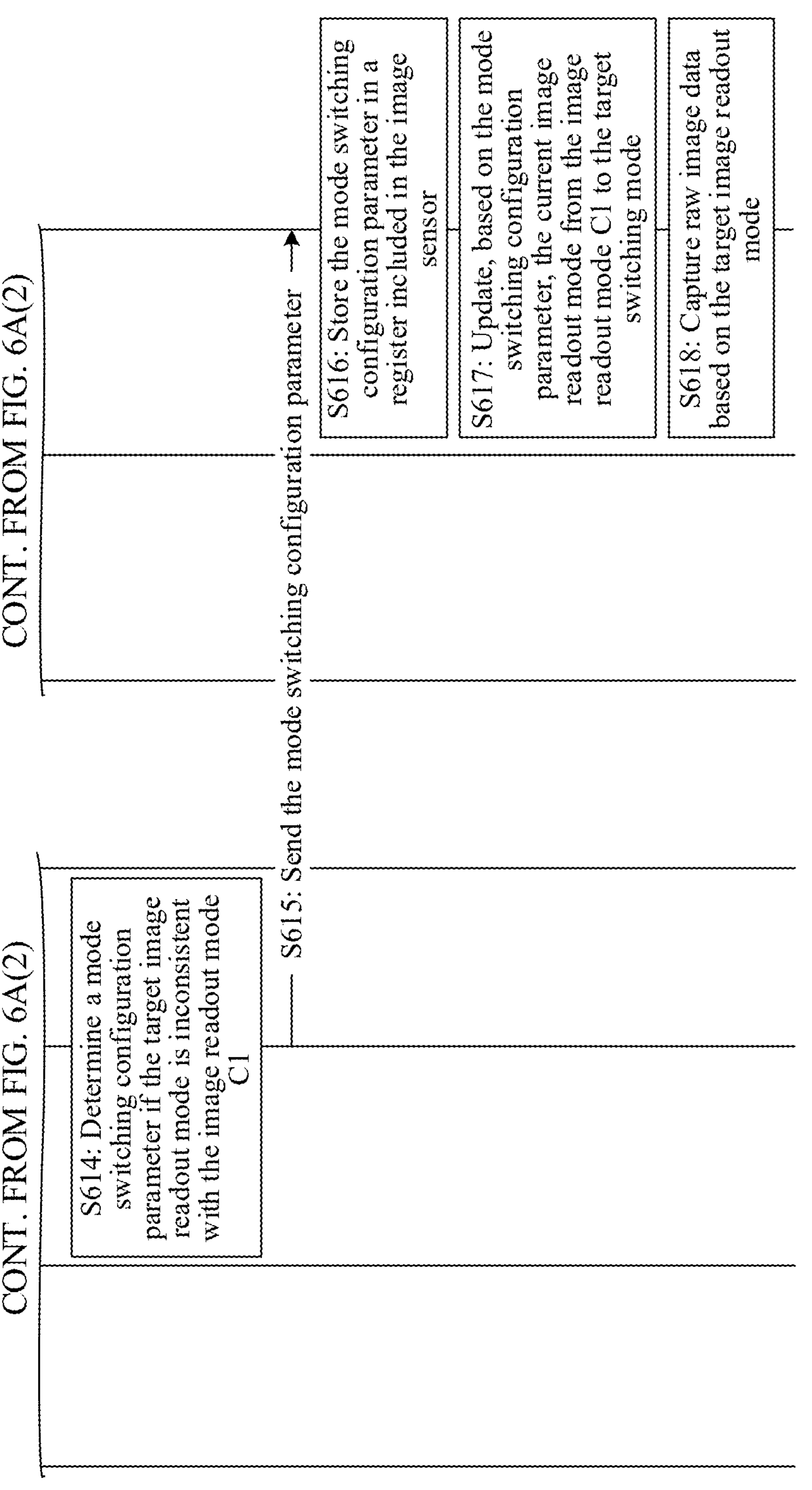
FIG. 6A(3)

IMAGE READOUT MODE SWITCHING METHOD AND RELATED DEVICE

CROSS-REFERENCE TO RELATED APPLICATIONS

This is a U.S. National al Stage of International Application No. PCT/CN2023/117483, filed on Sep. 7, 2023, which claims priority to Chinese Patent Application No. 202211356362.5, filed on Nov. 1, 2022, both of which are incorporated herein by reference in their entireties.

TECHNICAL FIELD

This application relates to the field of terminal technologies, and in particular, to an image readout mode switching method and a related device.

BACKGROUND

Different image readout modes (that is, image readout modes) have different advantages and disadvantages. When photographing is performed based on different camera modes, a user may need different image readout modes. In actual application, an electronic device may switch to a corresponding image readout mode based on a camera mode selected by the user.

SUMMARY

This application provides an image readout mode switching method and a related device. According to the image readout mode switching method, each camera mode may correspond to a plurality of image readout modes. During photographing, an electronic device may capture an image based on an image readout mode in a current camera mode. In addition, the electronic device may further determine a current specific photographing scene with reference to factors such as an HDR scene determination result, and determine a target image readout mode according to the current specific photographing scene. It may be understood that, a plurality of image readout modes corresponding to the current camera mode may include the target image readout mode. When the target image readout mode is inconsistent with the current image readout mode, the electronic device may switch to the target image readout mode by loading a corresponding mode switching configuration parameter. It may be understood that, a configuration parameter of the target image readout mode is loaded after the current camera mode is entered. The electronic device may switch an applied image readout mode from the current image readout mode to the target image readout mode through the corresponding mode switching configuration parameter. It may be understood that, a quantity of register sequences included in the mode switching configuration parameter is less than a quantity of register sequences included in a configuration parameter of an image readout mode. This method can determine and switch to corresponding image readout modes based on different photographing scenes in the same camera mode, which satisfies photographing needs of a user in different scenes. In addition, this method can avoid a delay caused by needing to download a configuration parameter of an image readout mode when switching between image readout modes, and can avoid, to some extent, problems such as picture non-fluency and freezing caused by loading the configuration parameter for an excessively long time.

According to a first aspect, this application provides an image readout mode switching method. The image readout mode switching method may be applied to an electronic device. The image readout mode switching method may include: The electronic device may load a first configuration parameter of a first image readout mode and a second configuration parameter of a second image readout mode when the electronic device enters a first camera mode of a camera application; the electronic device may display a first user interface of the camera application, where the first user interface includes a first preview window, and the first preview window includes a first preview image captured by the electronic device based on the first image readout mode; the electronic device may load a third configuration parameter for switching between image readout modes when a switching condition for switching from the first image readout mode to the second image readout mode is satisfied, where the third configuration parameter is used for instructing to switch from the first image readout mode to the second image readout mode, and a quantity of register sequences in the third configuration parameter is less than a quantity of register sequences in the second configuration parameter; and the electronic device may display a second user interface of the camera application, where the second user interface includes a second preview window, and the second preview window includes a second preview image captured by the electronic device based on the second image readout mode.

In the solution provided in this application, when entering the first camera mode of the camera application, the electronic device may load configuration parameters of a plurality of image readout modes corresponding to the first camera mode. The configuration parameters of the plurality of image readout modes may include the configuration parameter of the first image readout mode and the configuration parameter of the second image readout mode. The electronic device may capture the first preview image based on the first image readout mode and display the first preview image. When a switching condition for switching from the first image readout mode to the second image readout mode is satisfied, the electronic device may load a third configuration parameter for switching between image readout modes, and switch, based on the third configuration parameter, the applied image readout mode from the first image readout mode to the second image readout mode. It may be understood that, the configuration parameter of the second image readout mode (namely, the second configuration parameter) has been loaded. This method can avoid a delay caused by loading the configuration parameter of the second image readout mode when switching between image readout modes. In addition, a quantity of register sequences in the third configuration parameter is less than a quantity of register sequences in the second configuration parameter. Therefore, the foregoing method can greatly reduce a delay of switching between image readout modes, and avoid phenomena such as picture non-fluency and freezing caused by an excessively large delay of switching between image readout modes.

It may be understood that, the first camera mode may be any camera mode, for example, an ordinary photographing mode, an HDR video recording mode, a night scene mode, or a portrait photographing mode.

In some embodiments of this application, the user may trigger the electronic device to enter the first camera mode of the camera application by touching a camera mode option corresponding to the first camera mode. For related descriptions of the camera mode option, reference may be made to the following. Details are not described herein.

In some embodiments of this application, the first camera mode may be a default camera mode. In this case, the user may trigger the electronic device to enter the first camera mode of the camera application by touching a camera application icon (for example, a camera application icon 101 shown in FIG. 2A).

Certainly, the user may alternatively trigger the electronic device to enter the first camera mode through a gesture, a sound, or the like. This is not limited in this application.

In some embodiments of this application, the first image readout mode is different from the second image readout mode. The first drawing image readout mode may be any drawing image readout mode, and the second drawing image readout mode may be any drawing image readout mode different from the first drawing image readout mode.

In some embodiments of this application, as shown in FIG. 6A(1), FIG. 6A(2), and FIG. 6A(3), the first drawing image readout mode may be a drawing image readout mode C1. In this case, a raw image corresponding to the first preview image may be raw image data P1. When the drawing image readout mode C1 is inconsistent with the target drawing image readout mode, the second drawing image readout mode may be the target drawing image readout mode.

It may be understood that, the first image readout mode is a default image readout mode in the first camera mode. The first configuration parameter of the first image readout mode refers to a configuration parameter of the first image readout mode, and the second configuration parameter of the second image readout mode refers to a configuration parameter of the second image readout mode. For example, when the first camera mode is the ordinary photographing mode, the first image readout mode may be a Binning image readout mode, the first configuration parameter refers to a configuration parameter of the Binning image readout mode, the second image readout mode may be a Remosaic image readout mode, and the second configuration parameter refers to a configuration parameter of the Remosaic image readout mode. For another example, when the first camera mode is the HDR video recording mode, the first image readout mode may be a Binning image readout mode, the first configuration parameter refers to a configuration parameter of the Binning image readout mode, the second image readout mode may be an IDCG image readout mode, and the second configuration parameter refers to a configuration parameter of the IDCG image readout mode.

For example, when the first camera mode is the ordinary photographing mode, as shown in FIG. 2B, the first user interface may be a user interface 200, the first preview window may be a preview window 201 included in the user interface 200, and the first preview image may be an image displayed in the preview window 201 included in the user interface 200.

For example, when the first camera mode is the ordinary photographing mode, as shown in FIG. 2B, the second user interface may be a user interface 200, the second preview window may be a preview window 201 included in the user interface 200, and the second preview image may be an image displayed in the preview window 201 included in the user interface 200.

For example, when the first camera mode is the HDR video recording mode, as shown in FIG. 2D, the first user interface may be a user interface 400, the first preview window may be a preview window 201 included in the user interface 400, and the first preview image may be an image displayed in the preview window 201 included in the user interface 400.

For example, when the first camera mode is the HDR video recording mode, as shown in FIG. 2D, the second user interface may be a user interface 400, the second preview window may be a preview window 201 included in the user interface 400, and the second preview image may be an image displayed in the preview window 201 included in the user interface 400.

In some embodiments of this application, when the first camera mode is the ordinary photographing mode, the electronic device may load an ordinary photographing FMC configuration parameter when the electronic device enters the first camera mode of the camera application. The ordinary photographing FMC configuration parameter may include the first configuration parameter and the second configuration parameter. In a possible implementation, the ordinary photographing FMC configuration parameter may further include a configuration parameter of another image readout mode.

Similarly, when the first camera mode is the HDR video recording mode, the electronic device may load an HDR recording FMC configuration parameter when the electronic device enters the first camera mode of the camera application. The HDR recording FMC configuration parameter may include the first configuration parameter and the second configuration parameter. In a possible implementation, the HDR recording FMC configuration parameter may further include a configuration parameter of another image readout mode.

It may be understood that, for related descriptions of the first camera mode being another camera mode, reference may be made to the foregoing. Details are not described again in this application.

It may be understood that, the third configuration parameter refers to a mode switching configuration parameter. The third configuration parameter may include a control switch configuration parameter for switching to the second image readout mode.

It may be understood that, the quantity of the register sequences in the third configuration parameter is less than a quantity of register sequences in the second configuration parameter. In some embodiments of this application, the quantity of the register sequences in the third configuration parameter may be less than a quantity of register sequences in the first configuration parameter. In some embodiments of this application, the quantity of the register sequences in the third configuration parameter may be less than a quantity of register sequences in a configuration parameter of any image readout mode corresponding to the first camera mode.

With reference to the first aspect, in a possible implementation, before the electronic device loads the third configuration parameter for switching between image readout modes when the switching condition for switching from the first image readout mode to the second image readout mode is satisfied, the method may further include: The electronic device may determine, based on luma information of the first preview image, whether a current scene is an HDR scene, to obtain a first HDR scene determination result; and the electronic device may further search, based on a correspondence among a camera mode, an HDR scene determination result, and an image readout mode, for an image readout mode corresponding to the first camera mode and the first HDR scene determination result, where the found image readout mode is a target image readout mode. The satisfying a switching condition for switching from the first image readout mode to the second image readout mode may specifically include: the target image readout mode is the second image readout mode.

In the solution provided in this application, the electronic device may determine the HDR scene based on the luma information of the preview image (for example, the first preview image), and determine the target image readout mode based on the current camera mode (for example, the first camera mode) and the HDR scene determination result. In addition, when the target image readout mode is the second image readout mode, the electronic device may load the third configuration parameter, and switch from the first image readout mode to the second image readout mode. Through this method, the electronic device may determine a current specific photographing scene based on the luma information of the preview image, and select a proper image readout mode according to the current specific photographing scene and the camera mode, so that an image can be output in a more appropriate image readout mode, thereby obtaining an image that satisfies needs of the user better.

According to the foregoing, in some embodiments of this application, a raw image corresponding to the first preview image is raw image data P1. In this case, the luma information of the first preview image may also be understood as luma information included in image data P1-1.

It may be understood that, the first HDR scene determination result refers to an HDR scene determination result obtained based on the luma information of the first preview image. For specific descriptions of the HDR scene determination result, reference may be made to the following. Details are not described herein again.

It may be understood that, for a correspondence among a camera mode, an HDR scene determination result, and an image readout mode, reference may be made to Table 2.

With reference to the first aspect, in a possible implementation, before the electronic device loads the third configuration parameter for switching between image readout modes when the switching condition for switching from the first image readout mode to the second image readout mode is satisfied, the method may further include: The electronic device may determine a current zoom ratio; the electronic device may further determine, based on luma information of the first preview image, whether a current scene is an HDR scene, to obtain a first HDR scene determination result; and the electronic device may further search, based on a correspondence among a camera mode, a zoom ratio, an HDR scene determination result, and an image readout mode, for an image readout mode corresponding to the first camera mode, the current zoom ratio, and the first HDR scene determination result, where the found image readout mode is a target image readout mode. The satisfying a switching condition for switching from the first image readout mode to the second image readout mode may specifically include: the target image readout mode is the second image readout mode.

In the solution provided in this application, the electronic device may determine the HDR scene based on the luma information of the preview image (for example, the first preview image), and determine the target image readout mode based on the current camera mode (for example, the first camera mode), the current zoom ratio, and the HDR scene determination result. In addition, when the target image readout mode is the second image readout mode, the electronic device may load the third configuration parameter, and switch from the first image readout mode to the second image readout mode. Through this method, the electronic device may determine a current specific photographing scene based on the luma information of the preview image and the zoom ratio, and select a proper image readout mode according to the current specific photographing scene and the camera mode, so that an image can be output in a more appropriate image readout mode, thereby obtaining an image that satisfies needs of the user better.

It may be understood that, for a correspondence among a camera mode, a zoom ratio, an HDR scene determination result, and an image readout mode, reference may be made to Table 1.

With reference to the first aspect, in a possible implementation, that the electronic device determines, based on the luma information of the first preview image, whether the current scene is an HDR scene, to obtain the first HDR scene determination result may specifically include: The electronic device may determine a first adaptive dynamic range compression gain, first dark area luma information, and first ambient luma based on the luma information of the first preview image; the electronic device may determine whether the first adaptive dynamic range compression gain, the first dark area luma information, and the first ambient luma satisfy an HDR scene entry condition, and whether the first adaptive dynamic range compression gain, the first dark area luma information, and the first ambient luma satisfy an HDR scene exit condition; the electronic device may determine, when the first adaptive dynamic range compression gain, the first dark area luma information, and the first ambient luma satisfy the HDR scene entry condition, that the current scene is the HDR scene, where the first HDR scene determination result is used for indicating that the current scene is the HDR scene; and determine, when the first adaptive dynamic range compression gain, the first dark area luma information, and the first ambient luma satisfy the HDR scene exit condition, that the current scene is not the HDR scene, where the first HDR scene determination result is used for indicating that the current scene is not the HDR scene, where when the first adaptive dynamic range compression gain, the first dark area luma information, and the first ambient luma satisfy neither the HDR scene entry condition nor the HDR scene exit condition, the first HDR scene determination result is consistent with an HDR scene determination result obtained last time. The HDR scene entry condition may include: the first adaptive dynamic range compression gain is greater than a gain threshold Z1 or the first dark area luma information is less than a dark area luma threshold A1, and the first ambient luma is greater than an ambient luma threshold H1. The HDR scene exit condition may include: the first adaptive dynamic range compression gain is less than a gain threshold Z2 or the first dark area luma information is greater than a dark area luma threshold A2, and the first ambient luma is less than an ambient luma threshold H2. Z1 is greater than Z2, A1 is less than A2, and H1 is greater than H2.

In the solution provided in this application, the electronic device may determine the adaptive dynamic range compression gain, the dark area luma information, and the ambient luma based on the luma information of the preview image (for example, the first preview image), determine whether the current scene is an HDR scene according to these parameters, and obtain a determination result. Through this method, the electronic device may determine whether the current specific photographing scene includes the HDR scene, and prepare for subsequently determining whether switching from the first image readout mode to the second image readout mode is satisfied. In addition, through the foregoing method, if the adaptive dynamic range compression gain, the dark area luma information, and the ambient luma do not satisfy the HDR scene entry condition and the HDR scene exit condition, the first HDR scene determination result is consistent with the HDR scene determination result obtained last time, which can avoid an increase in power consumption caused by frequent switching between image readout modes.

It may be understood that, the first adaptive dynamic range compression gain, the first dark area luma information, and the first ambient luma respectively refer to AdrcGain, DarkLuma, and LV determined based on the luma information of the first preview image.

According to the foregoing, in some embodiments of this application, a raw image corresponding to the first preview image is raw image data P1. In this case, the first adaptive dynamic range compression gain, the first dark area luma information, and the first ambient luma represent the same meanings as the adaptive dynamic range compression gain (AdrcGain), the dark area luma information (DarkLuma), and the ambient luma (LV) shown in FIG. 6A(1), FIG. 6A(2), and FIG. 6A(3) do.

It may be understood that, for related descriptions of the HDR scene entry condition and the HDR scene exit condition, reference may be made to the following. Details are not described herein.

With reference to the first aspect, in a possible implementation, the method may further include: The electronic device may further load, when the electronic device enters the first camera mode of the camera application, a configuration parameter of at least one image readout mode other than the first image readout mode and the second image readout mode.

In the solution provided in this application, when entering the first camera mode, the electronic device may load configuration parameters of more image readout modes, which are not limited to the configuration parameter of the first image readout mode (that is, the first configuration parameter) and the configuration parameter of the second image readout mode (that is, the second configuration parameter). In this way, the electronic device can switch between more image readout modes in the same camera mode, greatly satisfying various photographing needs of the user.

With reference to the first aspect, in a possible implementation, that the electronic device displays the first user interface of the camera application may specifically include: After the electronic device loads the first configuration parameter and before the electronic device loads the second configuration parameter, the electronic device may display the first user interface of the camera application.

In the solution provided in this application, when entering the first camera mode of the camera application, the electronic device may first load the first configuration parameter of the first image readout mode, capture the first preview image based on the first image readout mode, and display the first user interface. After displaying the first user interface, the electronic device may load the second configuration parameter of the second image readout mode. In this manner, a delay between entering the camera mode and displaying the preview image can be shortened.

With reference to the first aspect, in a possible implementation, that the electronic device displays the first user interface of the camera application may specifically include: After the electronic device loads the second configuration parameter, the electronic device may display the first user interface of the camera application.

In the solution provided in this application, when entering the first camera mode of the camera application, the electronic device may load the first configuration parameter of the first image readout mode and the second configuration parameter of the second image readout mode, then capture the first preview image based on the first image readout mode, and display the first user interface. In this manner, the configuration parameter of the drawing image readout mode corresponding to the camera mode can be loaded as much as possible before the preview image is displayed, which is conducive to fast switching between drawing image readout modes after the camera application enters the camera mode.

In some embodiments of this application, the electronic device may first load the first configuration parameter of the first image readout mode, and apply the first configuration parameter, that is, capture an image based on the first image readout mode. Meanwhile, the electronic device may continue to load the second configuration parameter of the second image readout mode. In other words, there is no clear order for a moment when the electronic device applies the first configuration parameter and a moment when the electronic device loads the second configuration parameter.

With reference to the first aspect, in a possible implementation, the second user interface may include a first control. After the electronic device displays the second user interface of the camera application, the method may further include: The electronic device may load, in response to an operation acting on the first control, configuration parameters of a plurality of image readout modes corresponding to a second camera mode, where the plurality of image readout modes may include a third image readout mode; and the electronic device may further display a third user interface of the camera application, where the third user interface may include a third preview window, and the third preview window may include a third preview image captured by the electronic device based on the third image readout mode.

In the solution provided in this application, the user may trigger the electronic device to switch between camera modes (as shown in FIG. 2B and FIG. 2C). In response to the operation of switching between camera modes, the electronic device may reload configuration parameters of a plurality of image readout modes corresponding to a switched-to camera mode, and capture an image based on a default image readout mode in the switched-to camera mode. It may be understood that, for specific descriptions of the foregoing content, reference may be made to FIG. 7. Details are not described herein. In this way, when the electronic device switches between image readout modes in the same camera mode, there is no need to load the configuration parameter of the image readout mode that needs to be switched to, to reduce a delay of switching between image readout modes, so that picture display is more fluent, and freezing caused by an excessively large delay of switching between image readout modes is avoided.

It may be understood that, as shown in FIG. 7, the second camera mode is a switched-to camera mode.

It may be understood that, the second camera mode may be any camera mode different from the first camera mode. For example, an ordinary photographing mode, an HDR video recording mode, a night scene mode, or a portrait photographing mode. The third image readout mode may be a default image readout mode in the second camera mode.

It may be understood that, the first control may be any camera mode option of a camera mode option 202 (shown in FIG. 2B), and the first control is different from a camera mode option corresponding to the first camera mode. The first control may be a night scene mode option, a portrait mode option, a photographing mode option, or the like. For example, the camera mode option corresponding to the first camera mode may be a photographing mode option, and the first control may be a portrait mode option. It may be understood that, for camera modes respectively corresponding to the foregoing camera mode options, reference may be made to the following. Details are not described herein.

In some embodiments of this application, the camera mode option 202 may further include an HDR video recording mode option. In this case, the first camera mode may be an ordinary photographing mode, and the second camera mode may be an HDR video recording mode. It may be understood that, image readout modes corresponding to the HDR video recording mode may include a Binning image readout mode and an IDCG image readout mode. In a possible implementation, the third drawing image readout mode may be a Binning drawing image readout mode. In another possible implementation, the third image readout mode may be an IDCG image readout mode.

For example, when the first camera mode is the ordinary photographing mode, as shown in FIG. 2B, the first user interface may be the user interface 200. In this case, the second camera mode may be an HDR video recording mode. As shown in FIG. 2D, the third user interface may be a user interface 400, the third preview window may be a preview window 201 included in the user interface 400, and the third preview image may be an image displayed in the preview window 201 included in the user interface 400.

In some embodiments of this application, the first camera mode may be an HDR video recording mode, and the second camera mode may be an ordinary photographing mode.

For example, when the first camera mode is the HDR video recording mode, as shown in FIG. 2D, the first user interface may be the user interface 400. In this case, the first camera mode may be an ordinary photographing mode. As shown in FIG. 2B, the third user interface may be a user interface 200, the third preview window may be a preview window 201 included in the user interface 200, and the third preview image may be an image displayed in the preview window 201 included in the user interface 200.

In some embodiments of this application, That the electronic device loads the configuration parameters of the plurality of image readout modes corresponding to the second camera mode specifically includes: The electronic device may load configuration parameters of all image readout modes corresponding to the second camera mode.

In some embodiments of this application, the third image readout mode is a default image readout mode in the second camera mode.

In some embodiments of this application, the third image readout mode may be the same as the first image readout mode. In still other embodiments of this application, the third image readout mode may be the same as the second image readout mode. In still other embodiments of this application, the third image readout mode may be different from the first image readout mode and also different from the second image readout mode.

With reference to the first aspect, in a possible implementation, That the electronic device loads the first configuration parameter of the first image readout mode and the second configuration parameter of the second image readout mode when the electronic device enters the first camera mode of the camera application may specifically include: The electronic device may load, in response to an operation of converting the camera application from a background running state to a foreground running state, configuration parameters of a plurality of image readout modes corresponding to the first camera mode. The plurality of image readout modes may include the first image readout mode and the second image readout mode. The first camera mode is a camera mode used last time before the camera application is converted to the foreground running state.

In the solution provided in this application, the user may trigger the camera application to be converted from background running to foreground running (as shown in FIG. 2E and FIG. 2F). In response to an operation of converting the camera application from the background running to the foreground running, the electronic device may reload configuration parameters of a plurality of image readout modes corresponding to a camera mode used last time before the camera application is converted to the foreground running state. In this way, when the electronic device switches between image readout modes in the same camera mode, there is no need to load the configuration parameter of the image readout mode that needs to be switched to, to reduce a delay of switching between image readout modes, so that picture display is more fluent, and freezing caused by an excessively large delay of switching between image readout modes is avoided.

In some embodiments of this application, the operation of converting the camera application from the background running state to the foreground running state refers to: a user operation acting on a task card 501 in a user interface 500 (shown in FIG. 2E). In this case, the first camera mode is an HDR video recording mode.

In some embodiments of this application, That the electronic device loads the configuration parameters of the plurality of image readout modes corresponding to the first camera mode specifically includes: The electronic device may load configuration parameters of all image readout modes corresponding to the first camera mode.

In some embodiments of this application, the first camera mode may be a historical camera mode L1 shown in FIG. 8 and FIG. 9.

With reference to the first aspect, in a possible implementation, the first image readout mode is a default image readout mode in the first camera mode.

In the solution provided in this application, after the camera application is converted from the background running to the foreground running, the electronic device may capture an image based on a default image readout mode in the camera mode used last time before the camera application is converted to the foreground running state.

It may be understood that, the default drawing image readout mode in the first camera mode may be any one of a plurality of drawing image readout modes corresponding to the first camera mode.

With reference to the first aspect, in a possible implementation, the first image readout mode is an image readout mode used last time before the camera application is converted to the foreground running state.

In the solution provided in this application, after the camera application is converted from the background running to the foreground running, the electronic device may capture an image based on an image readout mode used last time before the camera application is converted to the foreground running state. It may be understood that, the plurality of image readout modes corresponding to the camera mode used last time before the camera application is converted to the foreground running state may include: an image readout mode used last time before the camera application is converted to the foreground running state.

In some embodiments of this application, the first image readout mode may be a historical image readout mode M1 shown in FIG. 9.

With reference to the first aspect, in a possible implementation, that the electronic device determines, based on the luma information of the first preview image, whether the current scene is an HDR scene, to obtain the first HDR scene determination result may specifically include: An automatic exposure control module in the electronic device may determine a first adaptive dynamic range compression gain, first dark area luma information, and first ambient luma based on the luma information of the first preview image; the automatic exposure control module may send the first adaptive dynamic range compression gain, the first dark area luma information, and the first ambient luma to a perception engine of the electronic device; and the perception engine may determine whether the current scene is the HDR scene based on the first adaptive dynamic range compression gain, the first dark area luma information, and the first ambient luma, and obtain the first HDR scene determination result.

It may be understood that, after the perception engine obtains the first HDR scene determination result, the method may further include: The perception engine may send the first HDR scene determination result to a decision module in the electronic device. In a possible implementation, the decision module may determine the target image readout mode based on the first camera mode and the first HDR scene determination result. In another possible implementation, the decision module may determine the target image readout mode based on the first camera mode, the current zoom ratio, and the first HDR scene determination result. After determining the target image readout mode, the decision module may send related information of the target image readout mode to a sensor node module in the electronic device.

With reference to the first aspect, in a possible implementation, that the electronic device loads the third configuration parameter for switching between image readout modes when the switching condition for switching from the first image readout mode to the second image readout mode is satisfied may specifically include: A sensor node module may determine the third configuration parameter when the target image readout mode is the second image readout mode, and send the third configuration parameter to a camera in the electronic device; and the camera may switch, based on the third configuration parameter, a configuration parameter of the currently applied image readout mode from the first configuration parameter to the second configuration parameter.

According to a second aspect, this application provides an electronic device, including one or more memories and one or more processors. The one or more memories are coupled to the one or more processors. The memory is configured to store computer program code. The computer program code includes computer instructions. When the one or more processors execute the computer instructions, the electronic device is caused to perform the method according to the first aspect and any possible implementation of the first aspect.

According to a third aspect, this application provides a computer storage medium, including computer instructions. The computer instructions, when run on an electronic device, cause the electronic device to perform the method according to the first aspect and any possible implementation of the first aspect.

According to a fourth aspect, an embodiment of this application provides a chip. The chip may be used in an electronic device. The chip includes one or more processors. The processor is configured to invoke computer instructions to cause the electronic device to perform the method according to the first aspect and any possible implementation of the first aspect.

According to a fifth aspect, an embodiment of this application provides a computer program product including instructions. The computer program product, when run on an electronic device, causes the electronic device to perform the method according to the first aspect and any possible implementation of the first aspect.

It may be understood that, the electronic device provided in the second aspect, the computer storage medium provided in the third aspect, the chip provided in the fourth aspect, and the computer program product provided in the fifth aspect are all configured to perform the method according to the first aspect and any possible implementation of the first aspect. Therefore, for the beneficial effects that can be achieved by them, reference may be made to the beneficial effects of the method according to the first aspect and any possible implementation of the first aspect. Details are not described herein again.

BRIEF DESCRIPTION OF DRAWINGS

FIG. 6A(1), FIG. 6A(2), and FIG. 6A(3) are a flowchart of another image readout mode switching method according to an embodiment of this application;

DESCRIPTION OF EMBODIMENTS

Figure 1:
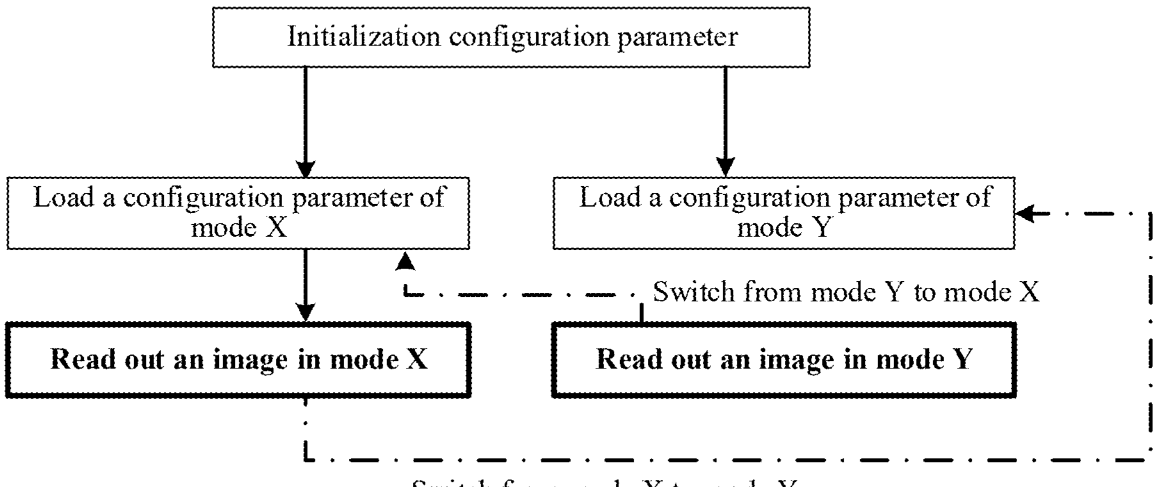
FIG. 1 is a schematic diagram of an image readout mode switching method according to an embodiment of this application.

The following clearly and completely describes technical solutions in embodiments of this application with reference to the accompanying drawings in the embodiments of this application. In the description of the embodiments of this application, "/" means "or" unless otherwise specified. For example, A/B may represent A or B. In the text, "and/or" describes only an association relationship for describing associated objects and represents that three relationships may exist. For example, A and/or B may represent the following three cases: Only A exists, both A and B exist, and only B exists. In addition, in the description of the embodiments of this application, "plurality" means two or more.

It should be understood that, in the specification, claims, and accompanying drawings of this application, the terms "first", "second", and so on are intended to distinguish between different objects but do not indicate a particular order. In addition, the terms "include", "have", and any variant thereof are intended to cover a non-exclusive inclusion. For example, processes, methods, systems, products, or devices including a series of steps or units is not limited to the listed steps or units, but instead, optionally include other steps or units not listed, or optionally include other steps or units inherent to these processes, methods, products, or devices.

Embodiment mentioned in this application means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this application may be combined with other embodiments.

An electronic device such as a mobile phone or tablet is generally provided with a camera module. During photographing by using the electronic device, a photosensitive element (for example, an image sensor) in the camera module may perform optical-to-electrical conversion, to obtain raw image data (that is, a RAW image). Image readout refers to a process in which the photosensitive element obtains a RAW image. Correspondingly, the image readout mode (that is, the image readout mode) refers to a manner in which the photosensitive element obtains a RAW image.

It may be understood that, the image sensor refers to an image sensor. The image sensor may include a CCD, a CMOS, or the like. The full name of the CCD is Charge-coupled Device, referring to a Charge-coupled Device image sensor. The full name of CMOS is Complementary Metal Oxide Semiconductor, referring to a Complementary Metal Oxide Semiconductor image sensor.

It may be understood that, the RAW image is raw data from which a light source signal captured by the image sensor such as a CCD or a CMOS is converted into a digital signal.

Three image readout modes are described below.

1. Binning

Binning is an image readout mode, and refers to adding induced charges in adjacent pixels together and reading out in a one-pixel mode. Binning is divided into a horizontal Binning and a vertical Binning. The horizontal Binning is to add charges of adjacent rows together for readout, and the vertical Binning is to add charges of adjacent columns together for readout. An advantage of the technology of Binning is that several pixels can be used jointly as one pixel. While maintaining the same field-of-view angle, a photosensitive area can be increased, sensitivity of dark areas to light sensing can be improved, and resolution can be reduced.

2. IDCG

The full name of IDCG is Intra-scene Dual Convert Gain, that is, intra-scene dual conversion gain image readout mode. IDCG refers to reading out two frames of images with High Conversion Gain (High Conversion Gain, HCG) and Low Conversion Gain (Low Conversion Gain, LCG) simultaneously based on the same exposure time, and finally fusing the images into one frame of image. In short, the IDCG is to obtain images at two conversion gains by one time of exposure, and finally fuse the images to obtain one frame of image.

3. Remosaic

Remosaic refers to converting raw pixel arrangement of a 4-cell sensor (4-cell sensor) into Bayer (Bayer) arrangement and then reading out an image.

According to the foregoing, different image readout modes have different advantages and disadvantages. For example, if an image is read out based on the Binning image readout mode, the number of frames can be increased without changing a field of view area and a ratio, and the sensitivity of dark areas to light sensing can also be increased. However, this image readout mode reduces the output resolution. For example, if an image is read out based on the IDCG image readout mode, a dynamic range of an output image can be improved. However, power consumption of this image readout mode is large. For another example, if an image is read out based on the Remosaic image readout mode, an image with many pixels and high resolution can be obtained. However, this image readout mode leads to small pixels and low light sensitivity.

Based on different advantages and disadvantages of different image readout modes, the electronic device may choose to switch to corresponding image readout modes based on different camera modes selected by a user. As shown in FIG. 1, after starting a camera application in the electronic device, the user may select a camera mode used during photographing, for example, an ordinary photographing mode, a night scene mode, or a portrait photographing mode. After determining that an image readout mode corresponding to the camera mode selected by the user is a mode X, the electronic device may load an initialization configuration parameter, then load a configuration parameter of the mode X, and finally read out an image in the mode X. Once the electronic device determines that the image readout mode is to be switched from the mode X to a mode Y, the electronic device may load a configuration parameter of the mode Y, and finally read out an image in the mode Y. Similarly, once the electronic device determines that the image readout mode is to be switched from the mode Y to the mode X, the electronic device needs to reload the configuration parameter of the mode X and override the previously loaded configuration parameter of the mode Y.

In other words, in a camera mode, each time an image readout mode is switched to, the electronic device needs to load a configuration parameter of the image readout mode. However, a configuration parameter of an image readout mode may include hundreds of sets of register sequences, which brings about a large switching delay. Once the electronic device does not complete loading in an extremely short time, a situation in which a picture displayed on the electronic device is not smooth when switching between image readout modes may even be caused.

This application provides an image readout mode switching method and a related device. According to the image readout mode switching method, each camera mode may correspond to a plurality of image readout modes. During photographing, an electronic device may capture an image based on an image readout mode in a current camera mode. In addition, the electronic device may further determine a current specific photographing scene with reference to factors such as a camera mode and an HDR scene determination result, and determine a target image readout mode according to the current specific photographing scene. When the target image readout mode is inconsistent with the current image readout mode, the electronic device may switch to the target image readout mode by loading a corresponding mode switching configuration parameter. It may be understood that, a configuration parameter of the target image readout mode is loaded after the current camera mode is entered. The electronic device may enable the image sensor in the camera to apply the configuration parameter of the target image readout mode through the corresponding mode switching configuration parameter, without having to apply the configuration parameter of the current image readout mode. In some embodiments, register sequences included in the mode switching configuration parameter are much fewer than register sequences included in a configuration parameter of an image readout mode. This method can determine and switch to corresponding image readout modes based on different photographing scenes in the same camera mode, which satisfies photographing needs of a user in different scenes. In addition, this method can avoid a delay caused by needing to download a configuration parameter of an image readout mode when switching between image readout modes, and can avoid, to some extent, problems such as picture non-fluency and freezing caused by loading the configuration parameter for an excessively long time.

For example, when the camera mode is an ordinary photographing mode, image readout modes corresponding thereto may include a Binning image readout mode and a Remosaic image readout mode. When the camera mode is an HDR video recording mode, image readout modes corresponding thereto may include a Binning image readout mode and an IDCG image readout mode.

It may be understood that, the electronic device in this application refers to a terminal device such as a mobile phone or a tablet computer. It may be understood that, the electronic device may alternatively be specifically a device such as a wearable device, an in-vehicle device, an augmented reality (Augmented Reality, AR) device/virtual reality (Virtual Reality, VR) device, a notebook computer, an ultra-mobile personal computer (Ultra-Mobile Personal Computer, UMPC), a netbook, a personal digital assistant (Personal Digital Assistant, PDA), or a special camera (for example, a single-lens reflex camera or a card camera). This application does not limit the specific type of the electronic device.

Some image readout mode switching scenarios provided in this application are described below with reference to schematic diagrams of a group of user interfaces.

It may be understood that, the terms "interface" and "user interface" in the specification, claims, and accompanying drawings of this application are a medium interface for performing interaction and information exchange between an application program or an operating system and a user, and implements conversion between an internal form of information and a form that can be accepted by the user. A commonly used expression form of the user interface is a graphical user interface (graphic user interface, GUI), which refers to a user interface related to a computer operation and that is displayed in a graphical manner. The user interface may be an interface element such as an icon, a window, or a control displayed on a display screen of the electronic device. The control may include a visual interface element such as an icon, a button, a menu, a tab, a text box, a dialog box, a status bar, a navigation bar, or a Widget.

1. Start a Camera Application, and Display a Default Camera Mode (FIG. 2A and FIG. 2B)

Figure 2A:
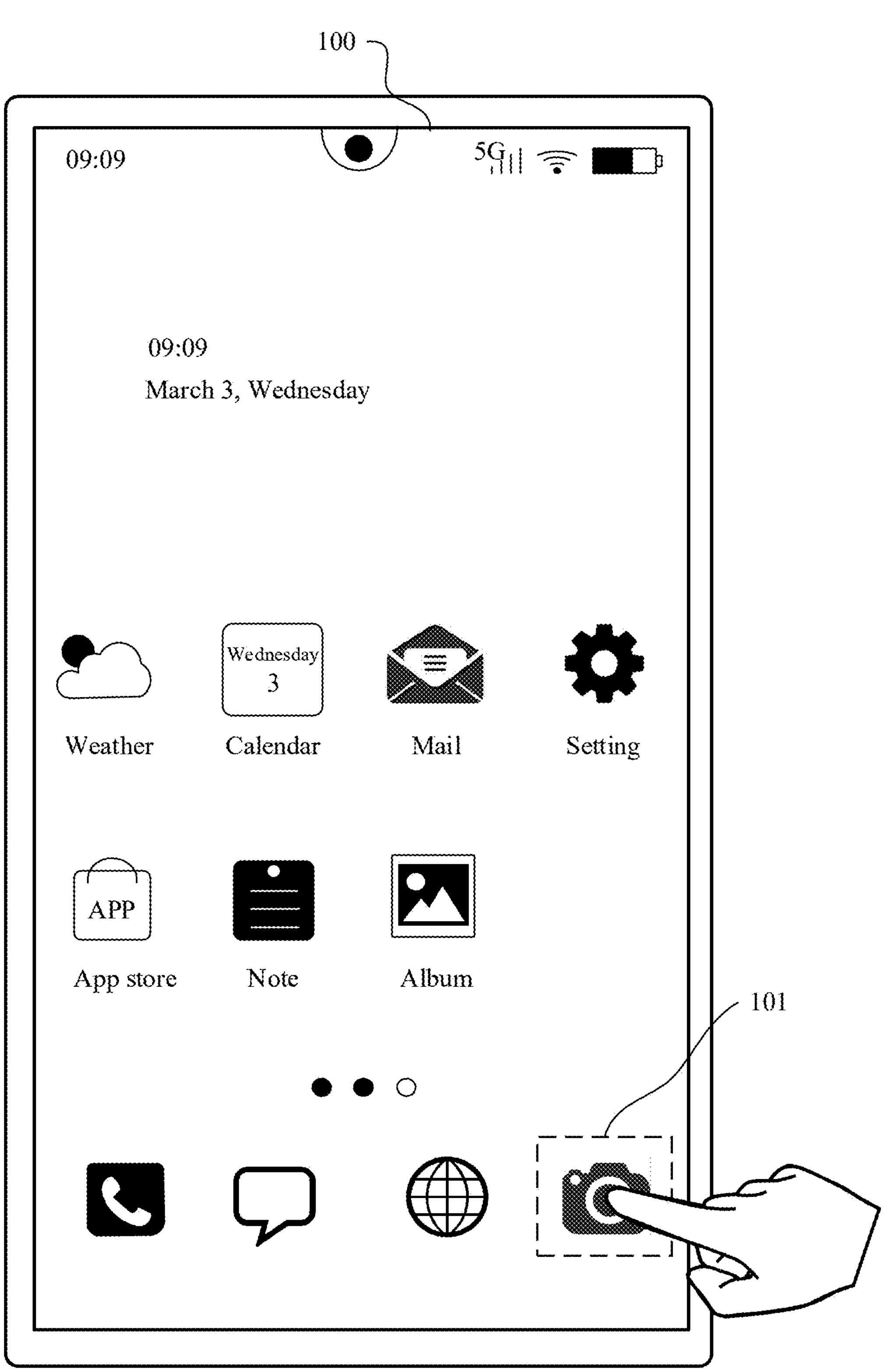
FIG. 2A to FIG. 2F are schematic diagrams of a group of user interfaces according to an embodiment of this application.
Figure 2B:
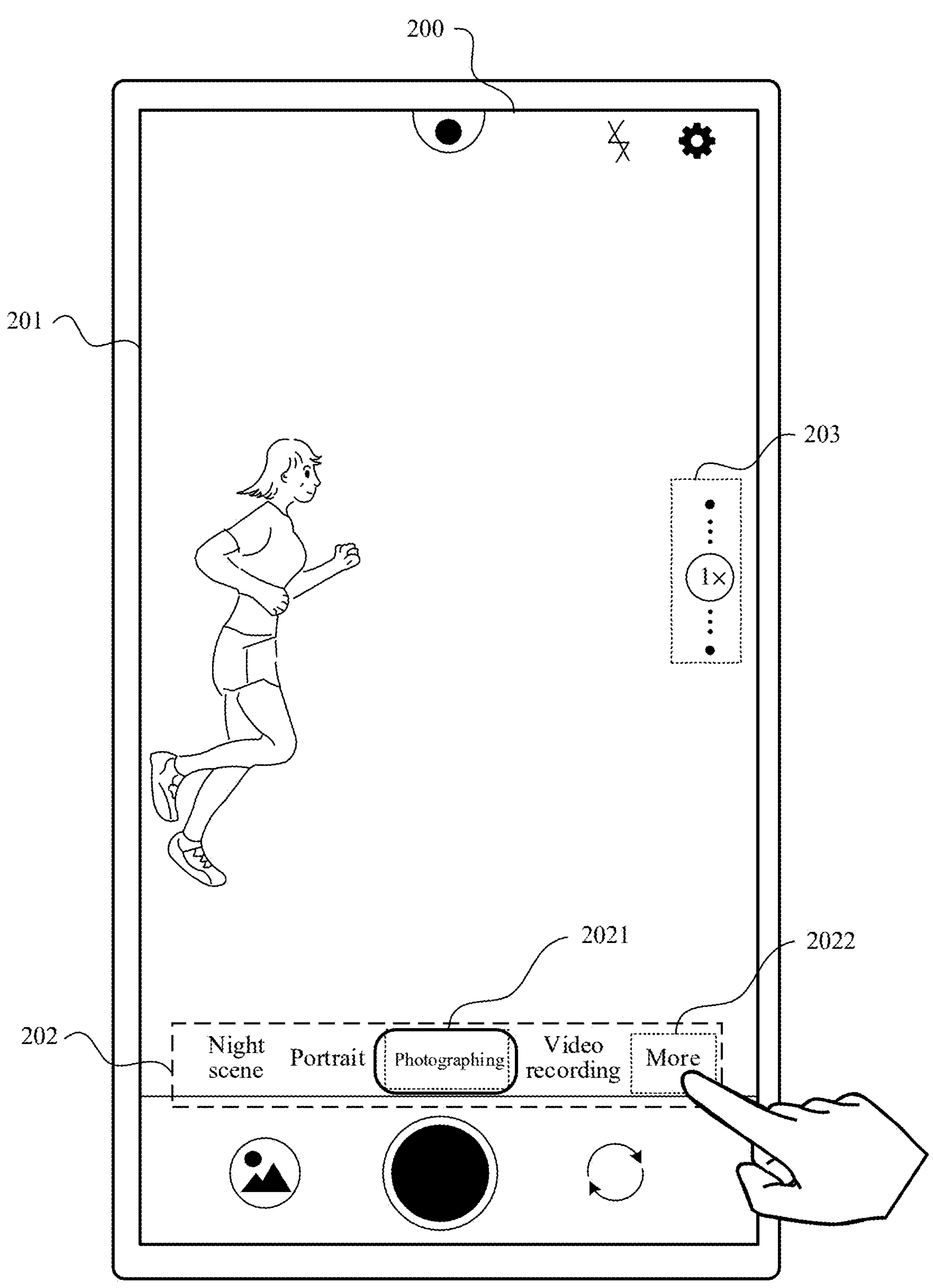

As shown in FIG. 2A, a user interface 100 displays a page including an application icon. The page may include a plurality of application icons (for example, a weather application icon, a calendar application icon, an album application icon, a note application icon, an email application icon, an application store application icon, and a setting application icon). A page indicator may be further displayed below the plurality of application icons, to indicate a positional relationship between a currently displayed page and another page. A plurality of application icons (for example, a camera application icon 101, a browser application icon, an information application icon, and a dial application icon) are located below the page indicator. An area in which these application icons are located may be referred to as a dock bar. The application icons in the dock bar are generally not transformed during page switching.

It may be understood that, the camera application icon 101 is an icon of a camera application program (that is, the camera application). The camera application icon 101 may be used for triggering start of the camera application program.

The electronic device may detect a user operation acting on the camera application icon 101. In response to the user operation, the electronic device may load configuration parameters of all image readout modes in a default camera mode (for example, an ordinary photographing mode), capture an image in a default image readout mode in the default camera mode, and display a user interface 200 shown in FIG. 2B. The user interface 200 is a photographing interface of the default camera mode of the camera application, and the user can preview an image and complete photographing on the interface.

As shown in FIG. 2B, the user interface 200 may include a preview window 201, a camera mode option 202, a zoom ratio control 203, an album shortcut control, a shutter control, and a camera flipping control.

The preview window 201 may be configured to display a preview image. The album shortcut control may be configured to start an album application program. The shutter control may be configured to listen for a user operation that triggers photographing. The camera flipping control can be configured to listen for a user operation that triggers flipping of the camera.

One or more camera mode options may be displayed in the camera mode option 202. The one or more camera mode options may include: a night scene mode option, a portrait mode option, a photographing mode option 2021, a video recording mode option, and a more option 2022. A camera mode corresponding to the photographing mode option 2021 is an ordinary photographing mode. Generally, as shown in FIG. 2B, the ordinary photographing mode is a default camera mode of the camera application. A camera mode corresponding to the night scene mode option is a night scene mode. A camera mode corresponding to the portrait mode option is a portrait photographing mode. A camera mode corresponding to the video recording mode option is an ordinary video recording mode. It may be understood that, the camera mode option 202 may alternatively include more or fewer photographing mode options.

The zoom ratio control 203 may be configured to adjust a zoom ratio. For a specific meaning of the zoom ratio, reference may be made to the following, and details are not described herein. It may be understood that, the user may adjust the zoom ratio by touching different positions of the zoom ratio control 203, or may adjust the zoom ratio by dragging the zoom ratio control 203 up and down.

It may be understood that, the user operation mentioned in this application may include, but is not limited to, a touch (for example, a click), a voice control, a gesture, and other operations. This is not limited in this application.

It may be understood that, after the camera application is started, the electronic device may capture an image in a default image readout mode (for example, a Binning image readout mode) of the ordinary photographing mode. In other words, an image displayed on the preview window 201 in the user interface 200 is obtained by the camera in the electronic device in the default image readout mode in the ordinary photographing mode. In this case, the electronic device may determine the HDR scene to obtain an HDR scene determination result, and then determine the target image readout mode with reference to the camera mode, the zoom ratio, and the HDR scene determination result. When the target image readout mode is inconsistent with the default image readout mode in the ordinary photographing mode, the electronic device may switch the current image readout mode from the default image readout mode in the ordinary photographing mode to the target image readout mode.

It may be understood that, for a specific manner in which the electronic device determines the target image readout mode, reference may be made to the following. Details are not described herein.

Figure 2C:
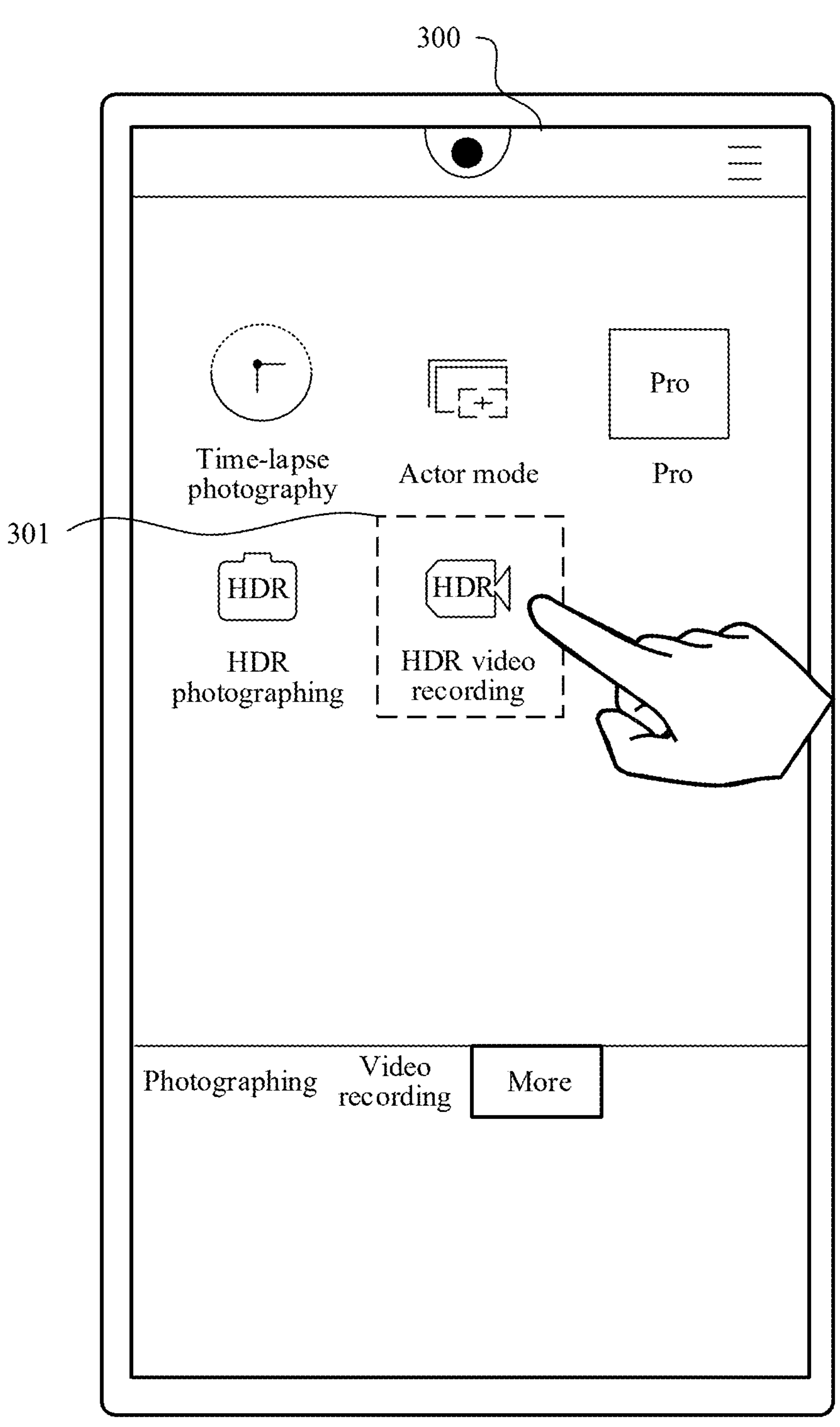
Figure 2D:
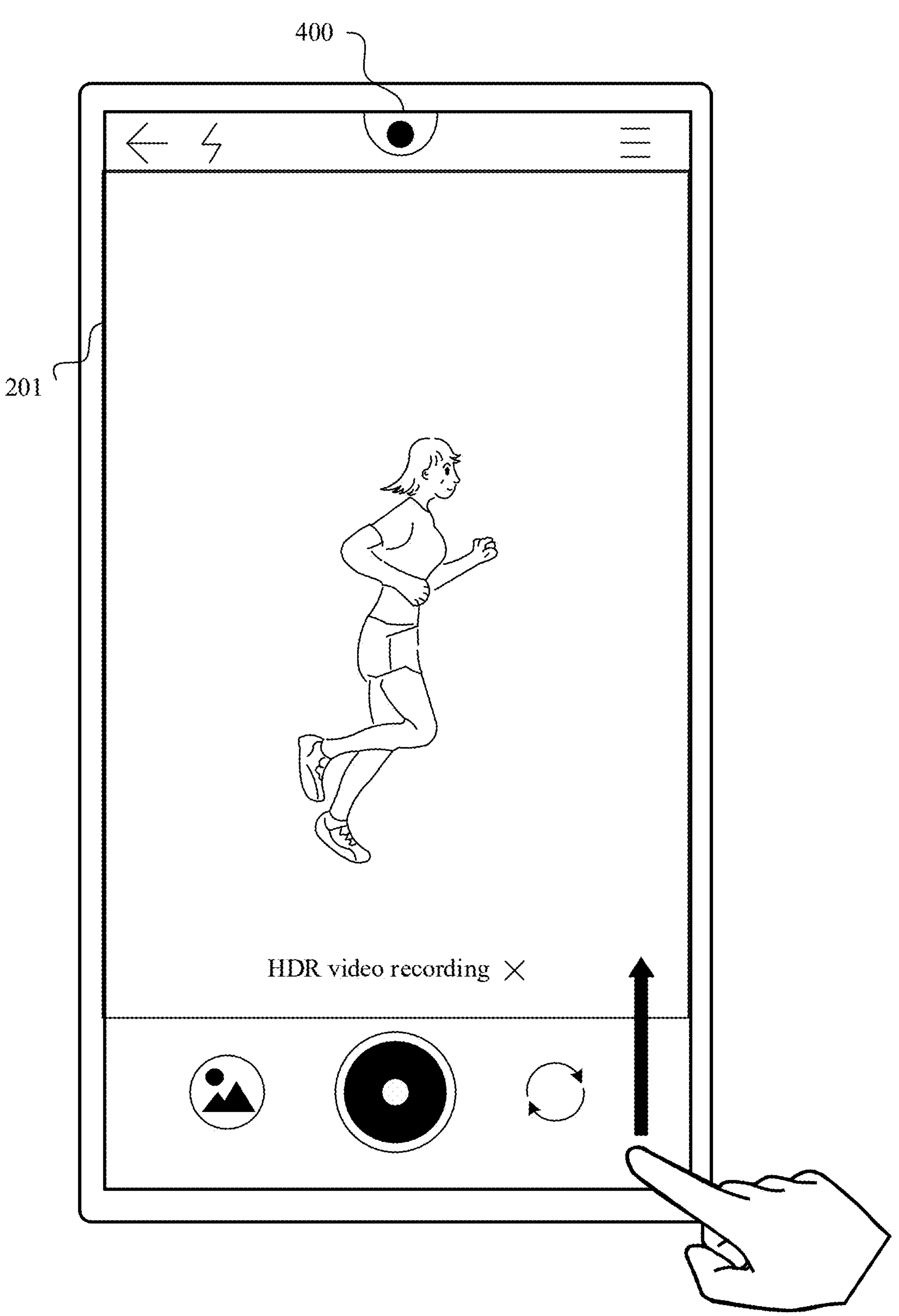

2. Switch Between Camera Modes (FIG. 2C and FIG. 2D)

The electronic device may detect a user operation acting on the more option 2022 shown in FIG. 2B. In response to the user operation, the electronic device may display a user interface 300 shown in FIG. 2C. The user interface 300 may include several camera mode options. As shown in FIG. 2C, the user interface 300 may include an HDR video recording mode option 301. A camera mode corresponding to the HDR video recording mode option 301 is an HDR video recording mode.

The electronic device may detect a user operation acting on the HDR video recording mode option 301. In response to the user operation, the electronic device may load configuration parameters of all image readout modes in the HDR video recording mode, capture an image in a default image readout mode in the HDR video recording mode, and display a user interface 400 shown in FIG. 2D.

It may be understood that, after the camera mode is switched from the ordinary photographing mode to the HDR video recording mode, the electronic device may capture an image in the default image readout mode (for example, an IDCG image readout mode) of the HDR video recording mode. In other words, an image displayed on the preview window 201 in the user interface 400 is obtained by the camera in the electronic device in the default image readout mode in the HDR video recording mode. In this case, the electronic device may determine the HDR scene to obtain an HDR scene determination result, and then determine the target image readout mode with reference to the camera mode, the zoom ratio, and the HDR scene determination result. When the target image readout mode is inconsistent with the default image readout mode in the HDR video recording mode, the electronic device may switch the current image readout mode from the default image readout mode in the HDR video recording mode to the target image readout mode.

Figure 2E:
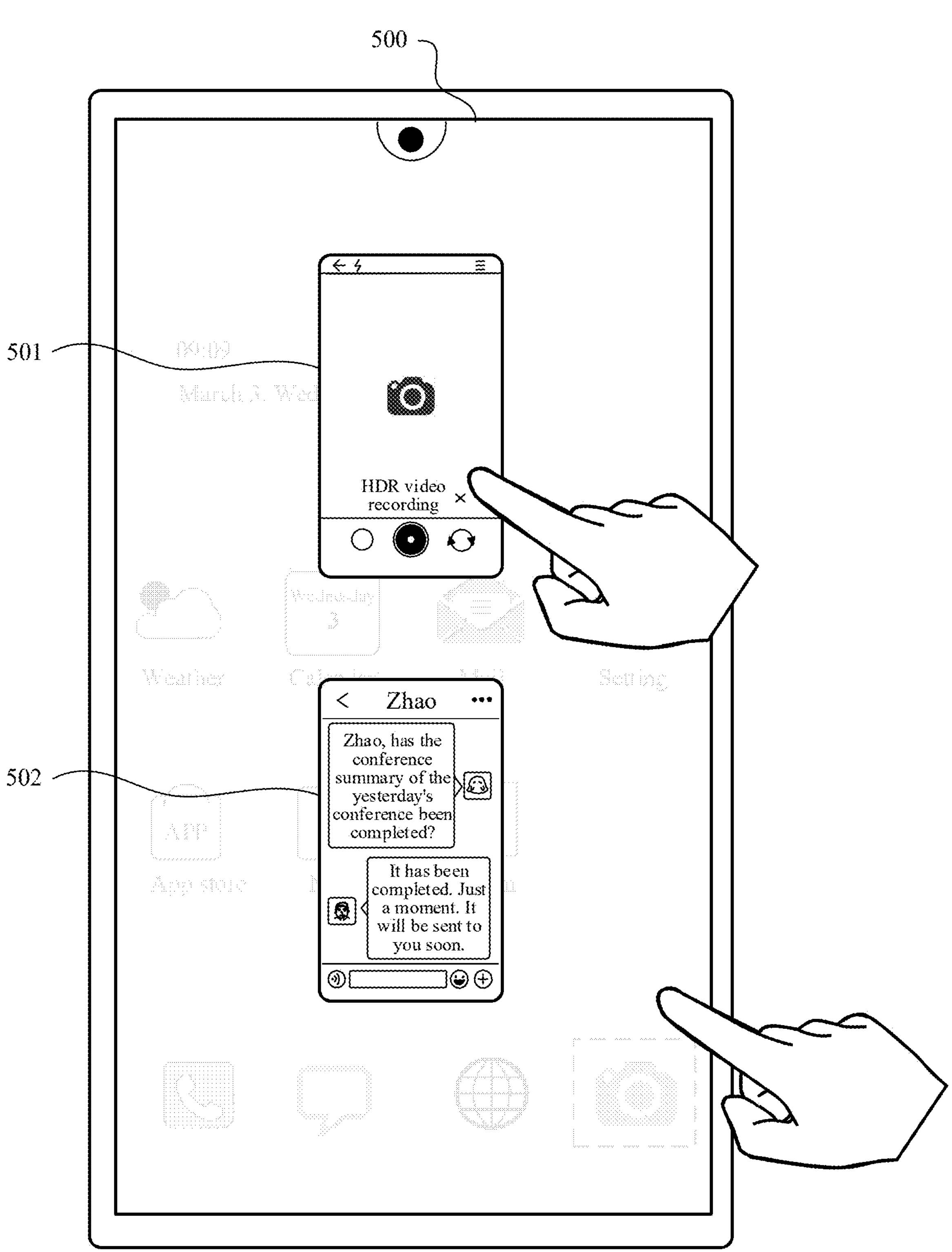

3. The Camera Application Exits Foreground Running (FIG. 2E)

The electronic device may detect a slide-up-and-stay gesture operation acting on the bottom of the user interface 400. In response to the gesture operation, the camera application exits the foreground running, and the electronic device may display a user interface 500 shown in FIG. 2E. The user interface 500 is a task view interface. The user interface 500 includes a task card 501 and a task card 502. The task card 501 is a task card corresponding to a camera application. The task card 502 is a task card corresponding to a communication application.

The electronic device may detect a user operation acting on a blank area on the user interface 500. In response to the user operation, the electronic device may re-display the user interface on which several application icons are placed. The user interface on which several application icons are placed is similar to FIG. 2A. A difference is that the time displayed on the user interface on which several application icons are placed may be different from that in FIG. 2A. The user interface on which several application icons are placed may be understood as a "desktop" of the electronic device. For ease of description, in this application, the user interface on which several application icons are placed is denoted as a user interface J1. It may be understood that, when the electronic device displays the user interface J1, the camera application is in a background running state.

It should be noted that the user may also trigger the camera application in another manner to exit the foreground running. This is not limited in this application. For example, the user may trigger, through a navigation key, the camera application to exit the foreground running.

Figure 2F:
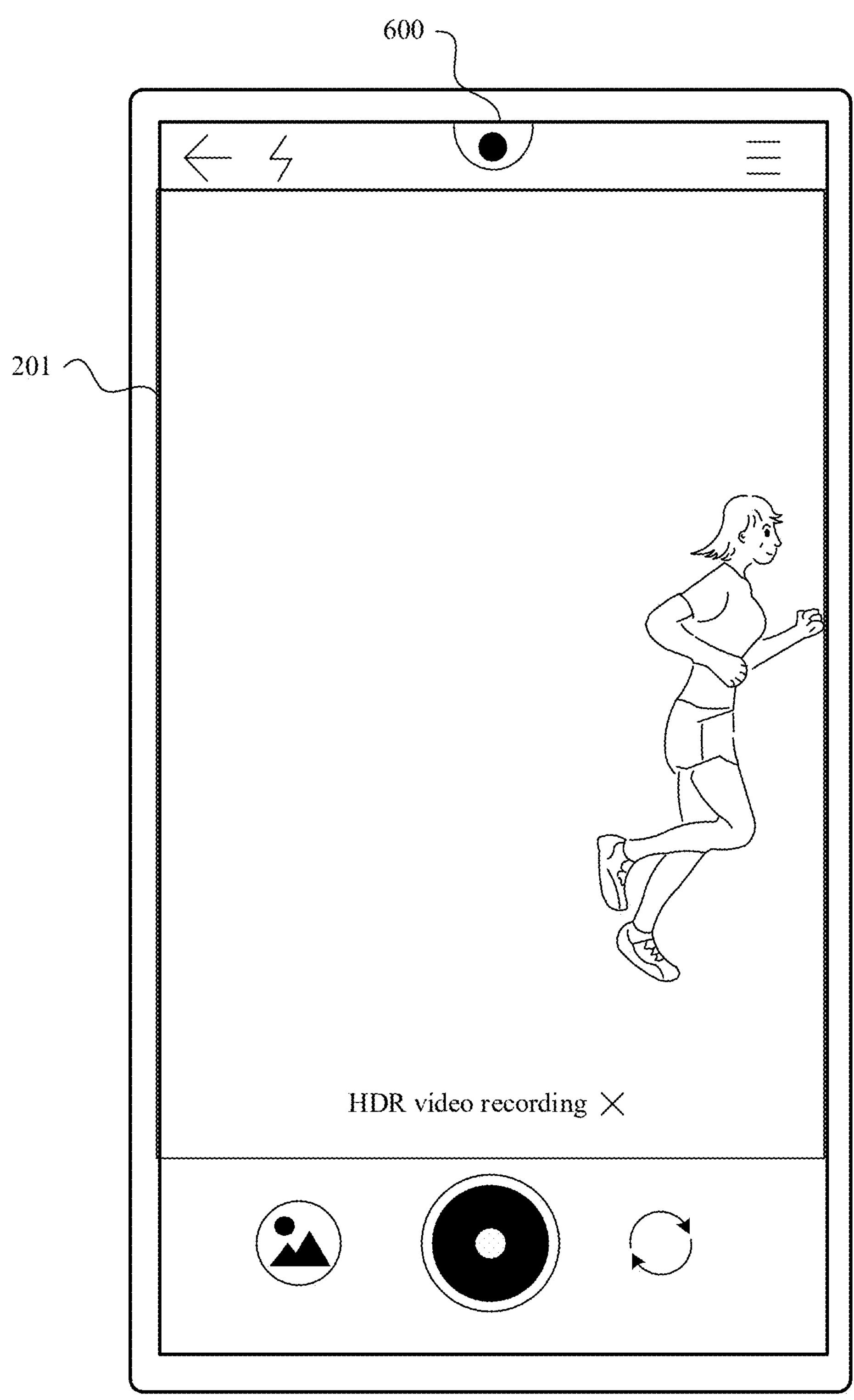

4. The Camera Application Returns to the Foreground Running (FIG. 2F)

The electronic device may detect a slide-up-and-stay gesture operation acting on the bottom of the user interface J1. In response to the gesture operation, the electronic device may re-display the user interface 500 shown in FIG. 2E.

The electronic device may detect a user operation acting on the task card 501 on the user interface 500. In response to the user operation, the electronic device may determine a most recently used camera mode and a most recently used image readout mode, load configuration parameters of all image readout modes corresponding to the most recently used camera mode, and capture an image in the most recently used image readout mode. Correspondingly, the electronic device may further display a user interface 600 shown in FIG. 2F. It may be understood that, when the electronic device displays the user interface 600, the camera application is in a foreground running state.

It may be understood that, all the image readout modes corresponding to the most recently used camera mode include the most recently used image readout mode. For ease of description, the most recently used image readout mode may be denoted as mode1. As shown in FIG. 2D, mode1 may be an HDR video recording mode.

It may be understood that, when the camera application returns to the foreground running again, an image may be captured in mode1 of the HDR video recording mode. In other words, an image displayed on the preview window 201 in the user interface 600 is obtained by the camera in the electronic device in mode1. Similarly, after the camera application returns to the foreground running again, the electronic device may determine the target image readout mode with reference to the camera mode, the zoom ratio, and the HDR scene determination result. When the target image readout mode is inconsistent with mode1, the electronic device may switch the current image readout mode from mode1 to the target image readout mode.

In some embodiments of this application, the electronic device may detect a user operation acting on the task card 501 on the user interface 500. In response to the user operation, the electronic device may determine a most recently used camera mode, load configuration parameters of all image readout modes corresponding to the most recently used camera mode, and capture an image in a default image readout mode in the most recently used image readout mode. Correspondingly, the electronic device may further display a user interface 600 shown in FIG. 2F.

It may be understood that, when the camera application returns to the foreground running again, an image may be captured in a default image readout mode in the HDR video recording mode. In other words, an image displayed on the preview window 201 in the user interface 600 is obtained by the camera in the electronic device in the default image readout mode in the HDR video recording mode. Similarly, after the camera application returns to the foreground running again, the electronic device may determine the target image readout mode with reference to the camera mode, the zoom ratio, and the HDR scene determination result. When the target image readout mode is inconsistent with the default image readout mode in the HDR video recording mode, the electronic device may switch the current image readout mode from the default image readout mode in the HDR video recording mode to the target image readout mode.

A software structure of an electronic device according to an embodiment of this application is described below with reference to FIG. 3.

Figure 3:
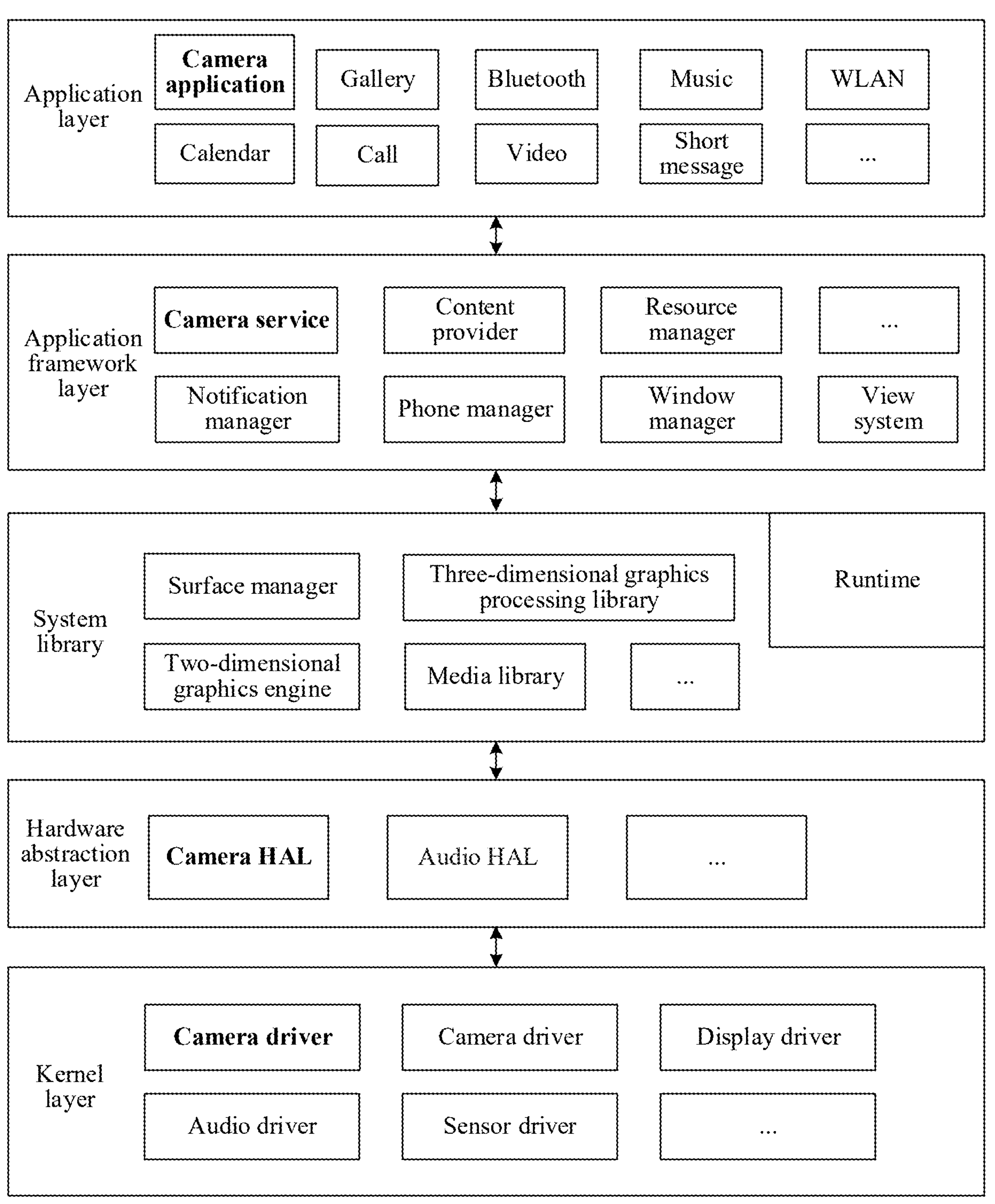
FIG. 3 is a schematic diagram of a software structure of an electronic device according to an embodiment of this application.

As shown in FIG. 3, a software framework of the electronic device involved in this application may include an application program layer, an application framework layer (framework, FWK), a system library, an Android runtime, a hardware abstraction layer (HAL), and a kernel layer (kernel).

The application layer may include a series of application packages, for example, application programs (which may also be referred to as applications for short) such as a camera application, a calendar, a gallery, a call, Bluetooth, a video, music, a short message, and a WLAN. The camera application may be used for photographing to obtain images and videos. It may be understood that, the user may touch the camera application icon 101 shown in FIG. 2A to trigger the electronic device to start the camera application, thereby implementing photographing through the camera application.

The application framework layer provides an application programming interface (Application Programming Interface, API) and a programming framework for the applications at the application layer. The application framework layer includes some predefined functions.

The application framework layer may include a series of system services. A system service is a modular component that focuses on a specific function. A function provided by the application framework API may communicate with a system service to access underlying hardware. As shown in FIG. 3, the application framework layer may include a camera service. During initial start of the system, the camera service runs. The camera service encapsulates a camera AIDL cross-process interface, provides the camera AIDL cross-process interface for invoking, then receives an image request from the upper application, and internally maintains processing logic about the request at the layer; and finally delivers the request by invoking a camera HIDL cross-process interface, awaits a return of a result, and then uploads the result to the upper application. The full name of AIDL is Android Interface Definition Language, which means Android Interface Definition Language. The full name of HIDL is HAL interface definition language, which means hardware abstraction layer interface definition language.

It may be understood that, the application framework layer may further include a window manager, a content provider, a view system, a phone manager, a resource manager, a notification manager, and the like. For specific meanings thereof, reference may be made to related technical documents, and details are not described herein.

The runtime (Runtime) is responsible for scheduling and managing the system. The Runtime includes a core library and a virtual machine. The core library includes two parts: One part is a performance function that a programming language (for example, java language) needs to invoke, and the other part is a core library of the system. The application layer and the application framework layer are run in the virtual machine. The virtual machine executes programming files (for example, java files) of the application layer and the application framework layer as binary files. The virtual machine is configured to execute functions such as object lifecycle management, stack management, thread management, security and exception management, and garbage collection.

The system library may include a plurality of function modules, such as a surface manager (Surface Manager), media libraries (Media Libraries), a three-dimensional graphics processing library (for example, OpenGL ES), and a two-dimensional graphics engine (for example, SGL). For specific meanings and roles of these functional modules, reference may be made to related technical documents, and details are not described herein.

The hardware abstraction layer (HAL) is an interface layer between an operating system kernel and upper software, and is used for abstracting hardware. The hardware abstraction layer is an abstract interface of a device kernel driver, and is configured to provide a higher-level Java API framework with an application programming interface for accessing an underlying device. The HAL may provide a standard interface to display device hardware functions to the higher-level Java API framework. The HAL includes a plurality of library modules, such as a camera HAL and an audio HAL. Each library module implements an interface for a specific type of hardware component. When the system framework layer API requires access to hardware of the portable device, the operating system loads a library module for the hardware component. It may be understood that, the camera HAL may provide the camera service with an interface for accessing hardware components such as a camera.

The kernel layer is the foundation of the Android operating system. The kernel layer is responsible for functions such as a hardware driver, a network, power supply, system security, and memory management. The kernel layer is an intermediate layer between hardware and software, and is configured to transfer a request of an application program to the hardware. The kernel layer may include a camera driver, a display driver, a camera driver, an audio driver, and a sensor driver.

It should be noted that the schematic diagram of the software structure of the electronic device shown in FIG. 3 provided in this application is merely used as an example, and does not limit the specific module division in different layers of the Android operating system. For details, reference may be made to the introduction to the software structure of the Android operating system in the conventional technology. In addition, the image readout mode switching method provided in this application may also be implemented based on other operating systems, which are not enumerated in this application.

Based on the software structure of the electronic device shown in FIG. 3, an image readout mode switching method according to an embodiment of this application is described with reference to FIG. 4 from a perspective of collaboration between software and hardware.

Figure 4:
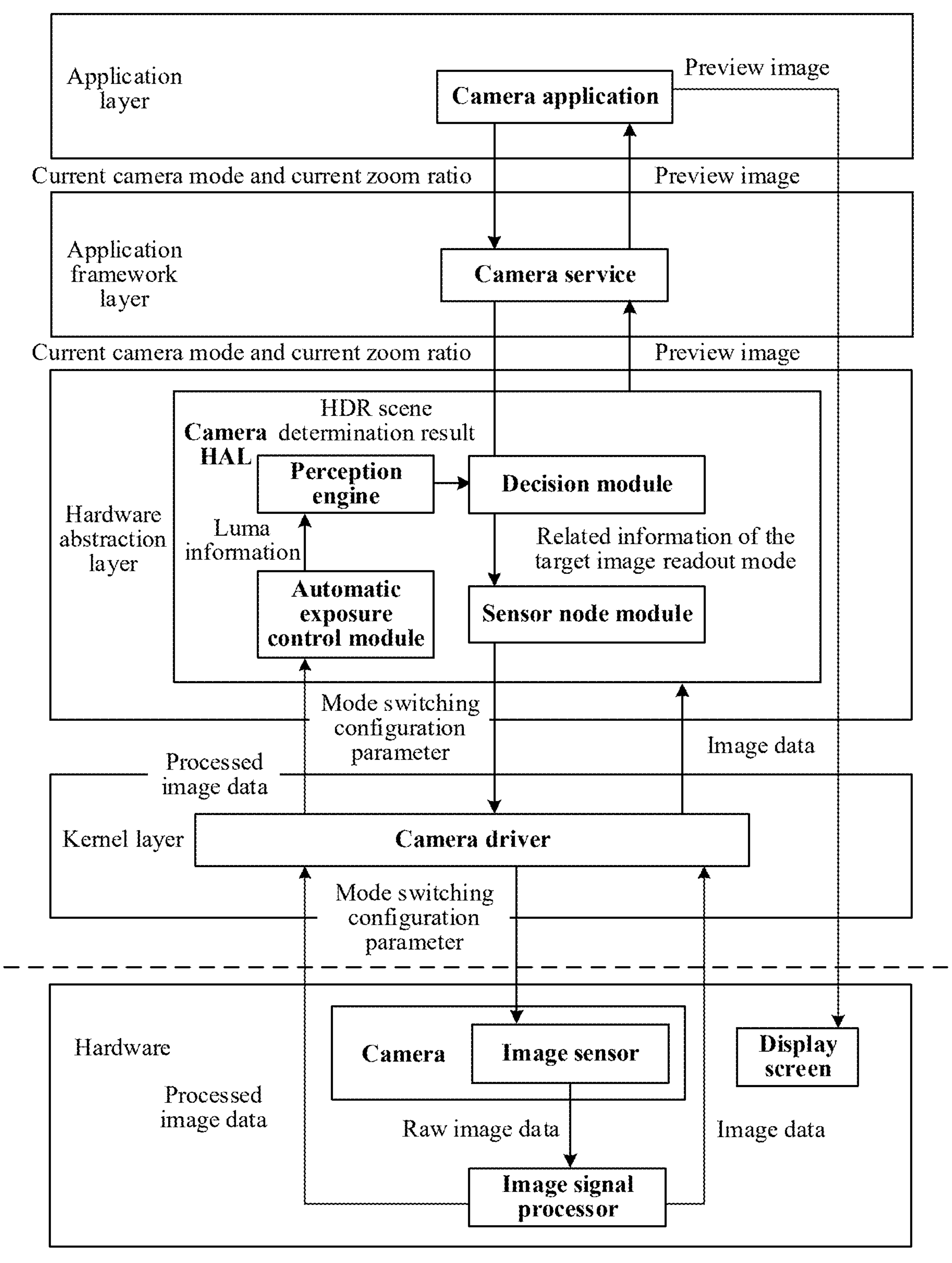
FIG. 4 is a schematic diagram of interaction between software and hardware according to an embodiment of this application.

First, the hardware involved in FIG. 4 is described.

A camera is configured to capture a static image or a video. In some embodiments, the electronic device may include one or more cameras. The camera may include an image sensor. The image sensor is a photosensitive element in the camera, and can convert a light signal on a photosensitive surface into an electrical signal in a corresponding proportional relationship with the light signal by using an optical-to-electrical conversion function of a photoelectric device. An image signal processor (Image Signal Processor, ISP) is configured to process data fed back by the camera. The display screen is configured to display an image, a video, and the like. The display screen may include a display panel. The display panel may be a liquid crystal display, an organic light-emitting diode, a flexible light-emitting diode, or the like. In some embodiments, the electronic device may include one or more display screens.

It may be understood that, Light is transferred to a photosensitive element of the camera through a lens, and an optical signal is converted into an electrical signal. The photosensitive element of the camera transfers the electrical signal to the ISP for processing, to obtain an image visible to a naked eye on the display screen.

It may be understood that, after the camera application enters a camera mode, the electronic device may load configuration parameters of all image readout modes corresponding to the camera mode, and apply a configuration parameter of a default image readout mode in the camera mode, that is, capture an image based on the default image readout mode in the camera mode. According to the foregoing, each camera mode may correspond to a plurality of image readout modes. A default drawing image readout mode in a camera mode is one of a plurality of drawing image readout modes corresponding to the camera mode. A default drawing image readout mode in a camera mode may be preset. Default image readout modes in different camera modes may be the same or different.

For example, an ordinary photographing mode and an HDR video recording mode are two camera modes. Image readout modes corresponding to the ordinary photographing mode may include a Binning image readout mode and a Remosaic image readout mode. image readout modes corresponding to the HDR video recording mode may include a Binning image readout mode and an IDCG image readout mode. In a possible implementation, the default image readout mode in the ordinary photo capturing mode may be the Binning image readout mode, and the default image readout mode in the HDR video recording mode may also be the Binning image readout mode. In another possible implementation, the default image readout mode in the ordinary photographing mode may be the Binning image readout mode, and the default image readout mode in the HDR video recording mode may also be the IDCG image readout mode.

As shown in FIG. 4, in an aspect, after the camera application is started and in the foreground running state, the camera application may determine a current camera mode and a current zoom ratio, and transfer the current camera mode and the current zoom ratio to the camera service. The camera service may then transfer the current camera mode and the current zoom ratio to a decision module. In addition, the camera can send raw image data captured by the image sensor to the image signal processor. After processing the raw image data, the image signal processor may send processed image data to the camera driver. The camera driver then sends the processed image data to an automatic exposure control module. The automatic exposure control module may obtain luma information based on the processed image data, and send the luma information to a perception engine. The perception engine may determine whether the current scene is an HDR scene based on the received luma information, obtain an HDR scene determination result, and send the HDR scene determination result to the decision module.

The decision module may obtain related information of the target image readout mode with reference to the current camera mode, the current zoom ratio, and the HDR scene determination result, and send the related information of the target image readout mode to a sensor node module when the target image readout mode is inconsistent with the current image readout mode. The sensor node module may determine a corresponding mode switching configuration parameter based on the related information of the target image readout mode, and send the mode switching configuration parameter to the camera driver. It may be understood that, the mode switching configuration parameter may include a control switch configuration parameter for switching to the target image readout mode. The camera driver then sends the mode switching configuration parameter to the camera. The camera may update, based on the mode switching configuration parameter, a configuration parameter of an image readout mode applied by the image sensor. That is to say, the image sensor may apply the configuration parameter of the target image readout mode. It may be understood that, the configuration parameter of the target image readout mode is loaded into a register included in the image sensor before the target image readout mode is switched to (for example, when the electronic device enters a current camera mode of the camera application). This means that the configuration parameter of the drawing image readout mode applied by the electronic device may be updated to the configuration parameter of the target drawing image readout mode, and the configuration parameter of the current drawing image readout mode is no longer applied.

It may be understood that, after the image sensor applies the configuration parameter of the target image readout mode, the image sensor may read out a frame based on the target image readout mode. In other words, the camera can capture raw image data based on the target image readout mode. The raw image data is processed by the image signal processor and sent to the camera driver, and then the camera driver transfers the processed raw image data upward to the camera HAL. The camera HAL may process the image data uploaded by the camera driver to obtain a preview image, and send the preview image upward to the camera application via the camera service. The camera application may send the preview image to a display screen for display. In this way, the user can see that a picture appears on the display screen.

The following describes specific implementations of the foregoing embodiments with reference to FIG. 5 to FIG. 9.

Figure 5:
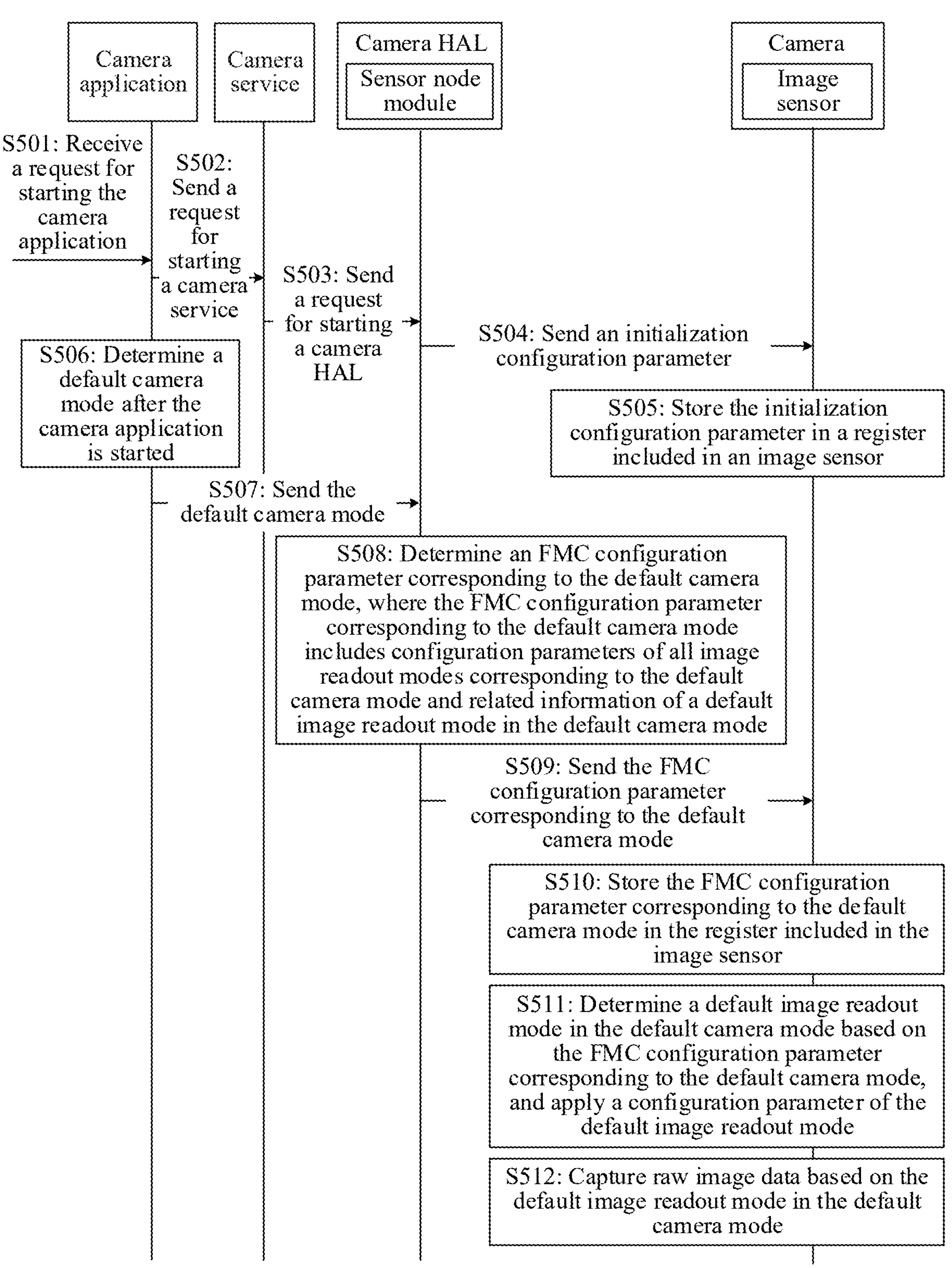
FIG. 5 is a flowchart of an image readout mode switching method according to an embodiment of this application.

1. Start a Camera Application, and Load Configuration Parameters of all Image Readout Modes Corresponding to a Default Camera Mode (as Shown in FIG. 5).

A user may trigger the start of the camera application. Referring to FIG. 5, after the camera application is started, the electronic device may load configuration parameters of all image readout modes corresponding to a default camera mode, and the electronic device may further apply a configuration parameter of a default image readout mode in the default camera mode, to capture an image based on the default image readout mode in the default camera mode.

S501: The camera application receives a request for starting the camera application.

It may be understood that, the user may trigger the electronic device to start the camera application. Correspondingly, the camera application in the electronic device may receive the request for starting the camera application.

For example, as shown in FIG. 2A, the user may click the camera application icon 101. Correspondingly, the electronic device may receive the request for starting the camera application. In response to the request for starting the camera application, the electronic device may start the camera application and display the user interface 200 shown in FIG. 2B. It may be understood that, the user may alternatively start the camera application through a voice, a gesture, or the like. A specific manner in which the user triggers the electronic device to start the camera application is not limited in this application.

S502: The camera application sends a request for starting a camera service to the camera service.

After receiving the request for starting the camera application, the camera application may deliver a request for starting a camera service to trigger start of the camera service. Correspondingly, the camera service may receive the request for starting the camera service sent by the camera application and start.

S503: The camera service sends a request for starting a camera HAL to the camera HAL.

After receiving the request for starting the camera service sent by the camera application, the camera service may deliver the request for starting the camera HAL to trigger start of a process in which the camera HAL is located. Correspondingly, the camera HAL may receive the request for starting the camera HAL sent by the camera service, and may start a corresponding process. It may be understood that, after the process in which the camera HAL is located is started, stream configuration may be performed.

It may be understood that, for a specific start process of the camera application (such as step S501 to step S503), reference may be made to related technical documents, and details are not described herein.

S504: A sensor node module in the camera HAL sends an initialization configuration parameter to a camera.

After the camera application is started, the sensor node module in the camera HAL may send the initialization configuration parameter to the camera. Specifically, after the process in which the camera HAL is located is started, the sensor node module in the camera HAL may send the initialization configuration parameter to the camera driver, and the camera driver then sends the initialization configuration parameter to the camera.

In some embodiments of this application, after stream configuration of the camera HAL, the sensor node module may send the initialization configuration parameter to the camera.

In some embodiments of this application, the camera driver may send a relevant configuration parameter (for example, an initialization configuration parameter) to the image sensor in the camera through an I2C interface, to write the relevant configuration parameter to a register included in the image sensor. I2C refers to Inter-Integrated Circuit, which means an inter-integrated circuit. For specific meanings and roles of I2C, reference may be made to the following and related technical documents, and details are not described herein.

It may be understood that, the initialization configuration parameter may include parameters such as a data transmission protocol, an internal timing, and an interrupt frequency.

It should be noted that the initialization configuration parameter may specifically include several register sequences. The register sequence may include an instruction and an address. For meanings of the instruction and the address in the register sequence, reference may be made to related technical documents, and details are not described herein.

Correspondingly, the camera may receive the initialization configuration parameter sent by the sensor node module.

S505: The camera stores the initialization configuration parameter in a register included in an image sensor.

It may be understood that, the image sensor in the camera may include a register. After receiving the initialization configuration parameter sent by the sensor node module, the camera may store the initialization configuration parameter in the register included in the image sensor.

S506: The camera application determines a default camera mode after the camera application is started.

After receiving the request for starting the camera application and being started, the camera application may determine a default camera mode. It may be understood that, if a user's request for changing the camera mode has not been received after the camera application is started, the electronic device captures an image in the default camera mode.

In some embodiments of this application, after the camera application is started, a default zoom ratio may be further determined. In this way, the electronic device may capture an image based on the default camera mode and the default zoom ratio.

For example, after receiving the request for starting the camera application and being started, the camera application may determine that the default camera mode is an ordinary photographing mode and the default zoom ratio may be 1×.

Certainly, the default camera mode may alternatively be set to another camera mode, and the default zoom ratio may alternatively be set to another zoom ratio. For example, the default camera mode may be a portrait photographing mode. For example, the default zoom ratio may be 1.5×.

It may be understood that, the camera mode may include an ordinary photographing mode, a portrait photographing mode, a night scene mode, an ordinary video recording mode, a micro-movie mode, an HDR video recording mode, and the like.

It should be noted that the zoom ratio mentioned in this application may represent a change degree of a focus of the camera. Correspondingly, the zoom ratio may also represent a change degree of a field-of-view angle and a size change of a photographed object in a picture (that is, an image displayed on a display screen of the electronic device). The photographed object refers to an object photographed by the camera. In some embodiments of this application, the photographed object is a human face.

It may be understood that, when distances between the photographed object and cameras are the same, a proportion of the photographed object in an image captured by using a long focus camera is greater than that of the photographed object in an image captured by using a short focus camera. Specifically, when the focus changes to n times the raw focus, the size of the photographed object in the picture also changes to n times the raw size. For example, if the focus of the camera increases to twice the raw focus, the size of the photographed object in the picture also increases to twice the raw size. In addition, when the focus changes, the field-ofview angle also changes correspondingly. Generally, a smaller focus indicates a larger field-of-view angle.

In this application, the zoom ratio may be represented as nx, which means that the focus changes to n times the raw focus, where n is a positive number. According to the above, a larger n indicates a larger focus and a smaller field-of-view angle indicate a larger photographed object in an image captured by the camera. It may be understood that, a specific value of n is not limited in this application. For example, n may be 10, 20, or 50. In some embodiments, n may reach 100 or even exceed 100. It should be noted that the raw focus is a default focus of the camera. In some embodiments of this application, cameras of the electronic device may be divided into a primary camera and a secondary camera. The raw focus refers to a default focus of the primary camera.

S507: The camera application sends the default camera mode to the sensor node module.

The camera application may send the default camera mode to the camera service, and then the camera service may send the default camera mode to the sensor node module.

In some embodiments of this application, the camera application may further send an identifier of the default camera mode to the sensor node module. The identifier of the default camera mode may be represented in the form of text, a number, a character string, or the like. This is not limited in this application. For example, the camera application may send Photo to the sensor node. Photo represents an ordinary photographing mode.

Correspondingly, the sensor node may receive the default camera mode sent by the camera application.

S508: The sensor node module determines an FMC configuration parameter corresponding to the default camera mode. The FMC configuration parameter corresponding to the default camera mode includes configuration parameters of all image readout modes corresponding to the default camera mode and related information of a default image readout mode in the default camera mode.

After receiving the default camera mode sent by the camera application, the sensor node module may determine an FMC configuration parameter corresponding to the default camera mode. FMC represents fast mode change, namely, fast mode change. The FMC configuration parameter corresponding to the default camera mode may include configuration parameters of all image readout modes corresponding to the default camera mode and related information of a default image readout mode in the default camera mode. It may be understood that, the default drawing image readout mode in the default camera mode may be preset.

For example, when the default camera mode is an ordinary photographing mode, the FMC configuration parameter corresponding to the default camera mode is an ordinary photographing FMC configuration parameter. The ordinary photographing FMC configuration parameter may include a configuration parameter of a Binning drawing image readout mode, a configuration parameter of a Remosaic drawing image readout mode, and related information of a default drawing image readout mode in the ordinary photographing mode.

It may be understood that, a configuration parameter of an image readout mode may include an image readout size, a color, a data transmission rate, and the like. Similar to the initialization configuration parameter, the configuration parameter of the image readout mode may also specifically include several register sequences. It may be understood that, a configuration parameter of each image readout mode may include several sets of register sequences. In actual application, a mode configuration parameter corresponding to one image readout mode may include hundreds of sets of register sequences.

It may be understood that, FMC configuration parameters corresponding to several camera modes are stored in the electronic device. An FMC configuration parameter corresponding to each camera mode may include configuration parameters of all image readout modes corresponding to the camera mode and related information of a default image readout mode in the camera mode.

In some embodiments of this application, related information of a default image readout mode in a camera mode may be an identifier of the default image readout mode. It may be understood that, the identifier of the default image readout mode may be represented through text, a number, or a character string. This is not limited in this application.

For example, Image readout modes corresponding to the ordinary photographing mode include a Binning image readout mode and a Remosaic image readout mode. When the identifier of the default image readout mode in the ordinary photographing mode is Binning, the default image readout mode in the ordinary photographing mode is the Binning image readout mode. When the identifier of the default image readout mode in the ordinary photographing mode is Remosaic, the default image readout mode in the ordinary photographing mode is the Remosaic image readout mode.

In some embodiments of this application, Related information of a default image readout mode in a camera mode may be represented by a register sequence. An instruction included in the register sequence may indicate the default image readout mode in the camera mode.

For example, Image readout modes corresponding to the ordinary photographing mode include a Binning image readout mode and a Remosaic image readout mode. An FMC configuration parameter corresponding to the ordinary photographing mode may include a register sequence used for indicating a default image readout mode. The register sequence may include 0x0001. 0x0001 is an instruction in the register sequence, and represents a meaning that a default photographing mode in the ordinary photographing mode is a Binning image readout mode. Similarly, the register sequence used for indicating the default mode in the FMC configuration parameter corresponding to the ordinary photographing mode may include 0x0011. The meaning represented by 0x0011 is that a default photographing mode in the ordinary photographing mode is a Remosaic image readout mode.

S509: The sensor node module sends the FMC configuration parameter corresponding to the default camera mode to the camera.

After determining the FMC configuration parameter corresponding to the default camera mode, the sensor node module may send the FMC configuration parameter corresponding to the default camera mode to the camera driver, and then the camera driver sends the FMC configuration parameter to the camera.

In some embodiments of this application, the camera driver may directly write the FMC configuration parameter corresponding to the default camera mode to the register in the image sensor included in the camera.

Correspondingly, the camera may receive the FMC configuration parameter corresponding to the default camera mode sent by the sensor node module.

S510: The camera stores the FMC configuration parameter corresponding to the default camera mode in the register included in the image sensor.

After receiving the FMC configuration parameter corresponding to the default camera mode sent by the sensor node module, the camera may store the FMC configuration parameter corresponding to the default camera mode in the register included in the image sensor.

S511: The camera determines a default image readout mode in the default camera mode based on the FMC configuration parameter corresponding to the default camera mode, and applies a configuration parameter of the default image readout mode.

After receiving the FMC configuration parameter corresponding to the default camera mode, the camera may determine the default image readout mode in the default camera mode based on the related information of the default image readout mode included in the FMC configuration parameter, and apply the configuration parameter of the default image readout mode.

For example, the default photographing mode is an ordinary photographing mode. Image readout modes corresponding to the ordinary photographing mode include a Binning image readout mode and a Remosaic image readout mode. The ordinary photographing FMC configuration parameter may include a register sequence used for indicating a default mode. When the register sequence used for indicating the default image readout mode includes 0x0001, the camera may determine that the default image readout mode in the ordinary photographing mode is the Binning image readout mode. In this way, the camera may apply the configuration parameter of the Binning image readout mode stored in the register. When the register sequence used for indicating the default image readout mode includes 0x0011, the camera may determine that the default image readout mode in the ordinary photographing mode is the Remosaic image readout mode. In this way, the camera may apply the configuration parameter of the Remosaic image readout mode stored in the register.

S512: The camera captures raw image data based on the default image readout mode in the default camera mode.

After the camera determines the default image readout mode in the default camera mode, the image sensor included in the camera may read out a frame according to the default image readout mode. In other words, the camera can capture the raw image data based on the default image readout mode. Correspondingly, other software and hardware modules in the electronic device may process the raw image data and finally display the processed raw image data on the display screen.

In some embodiments of this application, after performing step S501 to step S507, the electronic device may determine the configuration parameters of all the image readout modes corresponding to the default camera mode, and first load the configuration parameter of the default image readout mode in the default camera mode. After the loading is completed, the electronic device may directly apply the configuration parameter of the default image readout mode in the default camera mode, that is, capture an image based on the default image readout mode in the default camera mode. After loading of the configuration parameter of the default image readout mode in the default camera mode is completed, the electronic device may continue to load configuration parameters of other image readout modes (different from the default image readout mode) corresponding to the default camera mode.

Specifically, after receiving the default camera mode sent by the camera application, the sensor node module may determine the configuration parameters of all the image readout modes corresponding to the default camera mode. The sensor node module may first send the configuration parameter of the default image readout mode in the default camera mode to the camera. After receiving the configuration parameter of the default image readout mode in the default camera mode sent by the sensor node module, the camera may store the configuration parameter in the register included in the image sensor. In addition, the camera may directly apply the configuration parameter of the default image readout mode in the default camera mode, to capture an image based on the default image readout mode in the default mode camera. After sending the configuration parameter of the default image readout mode in the default camera mode to the camera, the sensor node module may successively send the configuration parameters of the other image readout modes in the default camera mode to the camera. After receiving the configuration parameters of the image readout modes, the camera may store the configuration parameters in the register of the image sensor.

2. Determine a Target Image Readout Mode, and Adjust a Current Image Readout Mode Based on the Target Image Readout Mode (as Shown in FIG. 6A(1), FIG. 6A(2), and FIG. 6A(3))

Referring to FIG. 6A(1), FIG. 6A(2), and FIG. 6A(3), when a camera application runs and a camera mode is unchanged, the electronic device may determine a target image readout mode with reference to the camera mode, a zoom ratio, and an HDR scene determination result, and adjust a current image readout mode based on the target image readout mode.

In some embodiments of this application, after performing the steps shown in FIG. 5, the electronic device may continuously determine a target image readout mode, and update the current image readout mode to the target image readout mode when the target image readout mode is inconsistent with the current image readout mode. That is to say, after performing the steps shown in FIG. 5, the electronic device may further perform steps shown in FIG. 6A(1), FIG. 6A(2), and FIG. 6A(3).

S601: The camera application determines a current camera mode and a current zoom ratio.

When being in a running state, the camera application may determine a current camera mode and a current zoom ratio. In some embodiments of this application, the camera application may determine a current camera mode and a current zoom ratio once every period of time (for example, 1 millisecond) and deliver the current camera mode and the current zoom ratio. The period of time may be set according to an actual requirement. This is not limited in this application.

S602: The camera application sends the current camera mode and the current zoom ratio to a decision module.

After determining the current camera mode and the current zoom ratio, the camera application may send the current camera mode and the current zoom ratio to the decision module.

Correspondingly, the decision module may receive the current camera mode and the current zoom ratio sent by the camera application.

S603: The camera captures raw image data P1 based on an image readout mode C1.

The image sensor included in the camera reads out a frame based on the image readout mode C1, so that raw image data is captured. It should be noted that the camera continuously captures the raw image data based on the image readout mode C1. The raw image data P1 is only part of the raw image data. It may be understood that, the raw image data P1 may be a RAW image.

In some embodiments of this application, the raw image data P1 may be raw image data corresponding to one frame of image captured by the camera. In still other embodiments of this application, the raw image data P1 may alternatively be raw image data corresponding to several frames of images captured by the camera.

It may be understood that, other software and hardware modules in the electronic device may process the raw image data P1 and finally display the processed raw image data P1 on the display screen.

S604: The camera sends the raw image data P1 to an image signal processor.

After capturing the raw image data P1, the camera may send the raw image data P1 to the image signal processor (ISP).

Correspondingly, the ISP can receive the raw image data P1 sent by the camera.

S605: The image signal processor processes the raw image data P1 to obtain image data P1-1.

After receiving the raw image data P1 sent by the camera, the ISP may process the raw image data P1 based on a hardware module such as an IFE included in the ISP, to obtain the image data P1-1. The full name of IFE is Image Front End, which means an image front end. Main roles of the IFE module may include color correction, downsampling, demosaicing, 3A data statistics, and the like.

It may be understood that, the ISP may further include hardware modules such as an image processing engine (Image Process Engine, IPE) and a Bayer processing segment (Bayer Processing Segment, BPS). For the hardware modules included in the ISP and specific meanings of the hardware modules, reference may be made to related technical documents, and details are not described herein.

S606: The image signal processor sends the image data P1-1 to an automatic exposure control module.

After processing the raw image data P1 and obtaining the image data P1-1, the ISP may send the image data P1-1 to the automatic exposure control module in the camera HAL.

Correspondingly, the automatic exposure control module may receive the image data P1-1 sent by the ISP.

S607: The automatic exposure control module determines an adaptive dynamic range compression gain, dark area luma information, and ambient luma based on the image data P1-1.

The adaptive dynamic range compression gain, the dark area luma information, and the ambient luma are first described.

The adaptive dynamic range compression gain refers to Adaptive dynamic range compression Gain, and may be referred to as AdrcGain for short. AdrcGain may represent a dynamic range. The dynamic range (dynamic range) is a term used to define a range within which the camera can capture tone details of an image, and generally refers to a range from a lowest value to a highest overflow value. In short, the dynamic range describes a ratio between a brightest tone and a darkest tone that the camera can record in a single frame. When the dynamic range is larger, the luma information included in the image is richer, and the luma and the color expression of the image are more vivid.

The dark area luma information may include average luma of dark areas of an image. For ease of description, DarkLuma is used in this application to represent average luma of dark areas of an image.

In some embodiments of this application, the automatic exposure control module may determine pixels whose luma is less than a preset luma threshold in the image data P1-1. These pixels are dark areas in the image data P1-1. The automatic exposure control module may further determine an average value of luma of all pixels in dark areas of the image data P1-1. The average value is average luma of the dark areas of the image data P1-1.

In some embodiments of this application, the automatic exposure control module may divide the image data P1-1 into areas, sort the areas in ascending order of an average value of luma of each area, and then select areas that rank top k % of the areas. It may be understood that, the k % of areas are the dark areas in the image data P1-1. The automatic exposure control module may determine average luma of the k % of areas. The average luma is the average luma of the dark areas of the image data P1-1. It may be understood that, k is in a range of (0, 100). For example, k may be 20.

In some embodiments of this application, the image data P1-1 sent by the ISP to the automatic exposure control module may include a histogram of the raw image data P1. The histogram may indicate luma of each pixel included in the raw image data P1. After receiving the image data P1-1, the automatic exposure control module may determine, based on the histogram, average luma of the top k % of pixels with lowest luma.

For ease of description, LV is used to represent the ambient luma in this application. It may be understood that, for a method for determining LV, reference may be made to related technical documents, and details are not described herein.

It may be understood that, the automatic exposure control module may determine AdrcGain, DarkLuma, and LV based on the luma information included in the image data P1-1. It should be noted that AdrcGain, DarkLuma, and LV represent, to some extent, the luma information of the image data P1-1.

S608: The automatic exposure control module sends the adaptive dynamic range compression gain, the dark area luma information, and the ambient luma to a perception engine.

After determining AdrcGain, DarkLuma, and LV based on the image data P1-1, the automatic exposure control module may send AdrcGain, DarkLuma, and LV to the perception engine.

Correspondingly, the perception engine may receive AdrcGain, DarkLuma, and LV sent by the automatic exposure control module.

S609: The perception engine determines whether a current scene is an HDR scene based on the adaptive dynamic range compression gain, the dark area luma information, and the ambient luma, and obtains an HDR scene determination result.

It may be understood that, HDR refers to High Dynamic Range Imaging, whose full name is High Dynamic Range Imaging. In computer graphics and cinematography, HDR is a group of technologies for achieving a larger exposure dynamic range (that is, a larger luma difference) than an ordinary digital image technology.

In some embodiments of this application, the perception engine may determine whether AdrcGain, DarkLuma, and LV satisfy an HDR scene entry condition and whether AdrcGain, DarkLuma, and LV satisfy an HDR scene exit condition. When AdrcGain, DarkLuma, and LV satisfy the HDR scene entry condition, the perception engine may determine that the current scene is an HDR scene, and obtain a corresponding HDR scene determination result. When AdrcGain, DarkLuma, and LV satisfy the HDR scene exit condition, the perception engine may determine that the current scene is not an HDR scene, and obtain a corresponding HDR scene determination result. When AdrcGain, DarkLuma, and LV neither satisfy the HDR scene entry condition nor the HDR scene exit condition, the perception engine may determine that the current scene is consistent with a previously determined scene, that is, the HDR scene determination result obtained this time is consistent with the HDR scene determination result obtained last time.

The HDR scene entry condition may include: AdrcGain is greater than the gain threshold Z1 or DarkLuma is less than the dark area luma threshold A1, and LV is greater than the ambient luma threshold H1. The HDR scene exit condition may include: AdrcGain is less than the gain threshold Z2 or DarkLuma is greater than the dark area luma threshold A2, and LV is less than the ambient luma threshold H2. It may be understood that, Z1>Z2, A1<A2, and H1>H2.

It may be understood that, the gain threshold Z1, the dark area luma threshold A1, the ambient luma threshold H1, the gain threshold Z2, the dark area luma threshold A2, and the ambient luma threshold H2 may be set according to actual needs. This is not limited in this application. For example, the gain threshold Z1 may be 2.2, the dark area luma threshold A1 may be 27, the ambient luma threshold H1 may be 50, the gain threshold Z2 may be 1.6, the dark area luma threshold A2 may be 36, and the ambient luma threshold H2 may be 46. It may be understood that, the unit of the ambient luma threshold H1 and the ambient luma threshold H2 may be candela/square meter (cd/m2).

It may be understood that, the luma mentioned in this application may also be represented by grayscale values of pixels in an image.

It should be noted that the order in which the perception engine determines whether AdrcGain, DarkLuma, and LV satisfy an HDR scene entry condition and whether AdrcGain, DarkLuma, and LV satisfy an HDR scene exit condition is not limited in this application. For example, the perception engine may first determine whether AdrcGain, DarkLuma, and LV satisfy the HDR scene entry condition and then determine whether AdrcGain, DarkLuma, and LV satisfy the HDR scene exit condition if AdrcGain, DarkLuma, and LV do not satisfy the HDR scene entry condition. For another example, the perception engine may first determine whether AdrcGain, DarkLuma, and LV satisfy the HDR scene exit condition and then determine whether AdrcGain, DarkLuma, and LV satisfy the HDR scene entry condition if AdrcGain, DarkLuma, and LV do not satisfy the HDR scene exit condition.

In some embodiments of this application, the perception engine may determine whether AdrcGain is greater than the gain threshold Z1, whether DarkLuma is less than the dark area luma threshold A1, and whether LV is greater than the ambient luma threshold H1. If AdrcGain is greater than the gain threshold Z1 or DarkLuma is less than the dark area luma threshold A1, and LV is greater than the ambient luma threshold H1, the perception engine may determine that the current scene is an HDR scene, and obtain a corresponding HDR scene determination result. Otherwise, the perception engine may determine that the current scene is not an HDR scene, and obtain a corresponding HDR scene determination result.

In some embodiments of this application, the perception engine may determine whether AdrcGain is less than the gain threshold Z2, whether DarkLuma is greater than the dark area luma threshold A2, and whether LV is less than the ambient luma threshold H2. If AdrcGain is less than the gain threshold Z2 or DarkLuma is greater than the dark area luma threshold A2, and LV is less than the ambient luma threshold H2, the perception engine may determine that the current scene is not an HDR scene, and obtain a corresponding HDR scene determination result. Otherwise, the perception engine may determine that the current scene is an HDR scene, and obtain a corresponding HDR scene determination result.

It may be understood that, the HDR scene determination result may be represented in the form of text, a number, a word, a character string, or the like. This is not limited in this application. For example, when the perception engine determines that the current scene is an HDR scene, the HDR scene determination result obtained by the perception engine is "yes", and when the perception engine determines that the current scene is not an HDR scene, the HDR scene determination result obtained by the perception engine is "no". For example, when the perception engine determines that the current scene is an HDR scene, the HDR scene determination result obtained by the perception engine is 1, and when the perception engine determines that the current scene is not an HDR scene, the HDR scene determination result obtained by the perception engine is 0. For another example, when the perception engine determines that the current scene is an HDR scene, the HDR scene determination result obtained by the perception engine is true, and when the perception engine determines that the current scene is not an HDR scene, the HDR scene determination result obtained by the perception engine is false.

S610: The perception engine sends the HDR scene determination result to the decision module.

After obtaining the HDR scene determination result, the perception engine may send the HDR scene determination result to the decision module.

Correspondingly, the decision module may receive the HDR scene determination result sent by the perception engine.

S611: The decision module determines a target image readout mode based on the current camera mode, the current zoom ratio, and the HDR scene determination result.

It may be understood that, a correspondence among a camera mode, a zoom ratio, an HDR scene determination result, and an image readout mode may be pre-stored in the electronic device. The decision module may search, in the correspondence, for an image readout mode corresponding to the current camera mode, the current zoom ratio, and the received HDR scene determination result. The image readout mode is the target image readout mode determined by the decision module.

It may be understood that, a correspondence among a photographing mode, a zoom ratio, an HDR scene determination result, and an image readout mode may be set according to an actual requirement. This is not limited in this application.

For example, as shown in Table 1, when the camera mode is the ordinary photographing mode, if the zoom ratio is less than 2×, the corresponding image readout mode is the Binning image readout mode; if the zoom ratio is not less than 2× and the current scene is an HDR scene, the corresponding image readout mode is the Remosaic image readout mode; and if the zoom ratio is not less than 2× and the current scene is not an HDR scene, the corresponding image readout mode is the Binning image readout mode. When the camera mode is the HDR video recording mode, if the current scene is an HDR scene, the corresponding drawing image readout mode is the IDCG drawing image readout mode; and if the current scene is not an HDR scene, the corresponding drawing image readout mode is the Binning drawing image readout mode.

TABLE 1

| Camera mode | Zoom ratio | HDR scene determination result | Image readout mode |
|---|---|---|---|
| Ordinary photographing mode | Less than 2x | | Binnning |
| Ordinary photographing mode | Not less than 2x | Yes | Remosaic |
| Ordinary photographing mode | Not less than 2x | No | Binnning |
| HDR video recording mode | | Yes | IDCG |
| HDR video recording mode | | No | Binnning |
| ... | ... | ... | ... |

Certainly, Table 1 is merely an example, and a correspondence among a camera mode, a zoom ratio, an HDR scene determination result, and an image readout mode is not limited to content shown in Table 1.

For example, after being started and entering an ordinary photographing mode, the camera application may continuously obtain a current camera mode and a current zoom ratio, and may further continuously determine an HDR scene. If the current camera mode received by the decision module may be the ordinary photographing mode, the current zoom ratio may be 2×, and the HDR scene determination result may be "yes", the decision module may determine, based on Table 1, that the target image readout mode is the Remosaic image readout mode.

S612: The decision module sends related information of the target image readout mode to the sensor node module.

After determining the target image readout mode, the decision module may send the related information of the target image readout mode to the sensor node module.

It may be understood that, the related information of the target image readout mode may include a name (for example, Binning/IDCG/Remosaic) of the target image readout mode, and may further include an identifier of the target image readout mode. The identifier of the target image readout mode may be represented in the form of text, a number, a character, a word, or the like. This is not limited in this application. For example, an identifier of the Binning image readout mode may be s1, an identifier of the IDCG image readout mode may be s2, and an identifier of the Remosaic image readout mode may be s3.

For example, after determining that the target image readout mode is the Remosaic image readout mode, the decision module may send s3 to the sensor node module.

Correspondingly, the sensor node module may receive the related information of the target image readout mode sent by the decision module.

S613: The sensor node module determines, based on the related information of the target image readout mode, whether the target image readout mode is consistent with the image readout mode C1.

After receiving the related information of the target image readout mode sent by the decision module, the sensor node module may determine the target image readout mode, compare the target image readout mode with the current image readout mode (namely, the image readout mode C1), and determine whether the target image readout mode is consistent with the current image readout mode. It may be understood that, the sensor node module may obtain related information of the current image readout mode. In some embodiments of this application, the related information of the current image readout mode may be stored in the sensor node module. For the descriptions of the related information of the current image readout mode, reference may be made to the foregoing descriptions of the related information of the target image readout mode. Details are not described herein again.

For example, the sensor node module may receive s3, to determine that the target image readout mode is the Remosaic image readout mode. When the camera application is started and the camera mode is not adjusted, the current camera mode is the default camera mode. If the default camera mode is the ordinary photographing mode, and the default image readout mode in the ordinary photographing mode is the Binning image readout mode, the current image readout mode (that is, the image readout mode C1) is the Binning image readout mode. The related information of the Binning image readout mode may be stored in the sensor node module. Then, the sensor node module may determine that the target image readout mode is inconsistent with the image readout mode C1.

It should be noted that if the target image readout mode is consistent with the image readout mode C1, the electronic device may not perform subsequent steps. In this case, the camera may continue to capture the raw image data based on the image readout mode C1.

S614: If the target image readout mode is inconsistent with the image readout mode C1, the sensor node module determines a mode switching configuration parameter.

It may be understood that, Because the current camera mode does not change, the target image readout mode and the image readout mode C1 are image readout modes corresponding to the current camera mode. If the sensor node module determines that the target image readout mode is inconsistent with the image readout mode C1, the mode switching configuration parameter may be determined. The mode switching configuration parameter may be used for indicating that the camera applies a configuration parameter of the target image readout mode stored in the register included in the image sensor of the camera. It may be understood that, the mode switching configuration parameter may include a control switch configuration parameter for switching to the target image readout mode. It may be understood that, the mode switching configuration parameter may include several register sequences. It should be noted that register sequences included in the mode switching configuration parameter are much fewer than register sequences included in a configuration parameter of one image readout mode. Generally, the mode switching configuration parameter includes several sets or a dozen sets of register sequences, while a configuration parameter of one image readout mode may include several hundreds of sets of register sequences.

For example, when the current camera mode is the ordinary photographing mode, if the drawing image readout mode C1 is the Binning drawing image readout mode, and the target drawing image readout mode is the Remosaic drawing image readout mode, the sensor node module may determine that the mode switching configuration parameter is setting0. It may be understood that, setting0 may be used for indicating that the camera is switched from the Binning drawing image readout mode to the Remosaic drawing image readout mode. setting0 may include a register sequence used for indicating that the camera applies a configuration parameter of the Remosaic image readout mode. Similarly, when the current camera mode is the ordinary photographing mode, if the drawing image readout mode C1 is the Remosaic drawing image readout mode, and the target drawing image readout mode is the Binning drawing image readout mode, the sensor node module may determine that the mode switching configuration parameter is setting1. It may be understood that, setting1 may be used for indicating that the camera is switched from the Remosaic drawing image readout mode to the Binning drawing image readout mode. setting1 may include a register sequence used for indicating that the camera applies a configuration parameter of the Binning image readout mode. For example, setting0 may include 0100, and setting1 may include 0101.

It may be understood that, the mode switching configuration parameter may be a seamless switching configuration parameter, that is, seamless setting.

For example, when image readout mode switching is performed in the ordinary photographing mode, the corresponding mode switching configuration parameter may include seamless setting0 and seamless setting1. When the drawing image readout mode C1 is the Binning drawing image readout mode, and the target mode is the Remosaic drawing image readout mode, the sensor node module may determine that the mode switching configuration parameter is seamless setting1. When the drawing image readout mode C1 is the Remosaic drawing image readout mode, and the target mode is the Binning drawing image readout mode, the sensor node module may determine that the mode switching configuration parameter is seamless setting0.

In some embodiments of this application, when image readout mode switching is performed in different camera modes, corresponding mode switching configuration parameters may be the same.

For example, when image readout mode switching is performed in the ordinary photographing mode, the corresponding mode switching configuration parameter may include seamless setting0 and seamless setting1. When image readout mode switching is performed in the HDR video recording mode, the corresponding mode switching configuration parameter may also include seamless setting0 and seamless setting1. Differently, when image readout mode switching is performed in the ordinary photographing mode, if the corresponding mode switching configuration parameter is seamless setting1, it indicates that the image readout mode is switched from the Binning image readout mode to the Remosaic image readout mode, and if the corresponding mode switching configuration parameter is seamless setting0, it indicates that the image readout mode is switched from the Remosaic image readout mode to the Binning image readout mode; and when image readout mode switching is performed in the HDR video recording mode, if the corresponding mode switching configuration parameter is seamless setting1, it indicates that the image readout mode is switched from the Binning image readout mode to the IDCG image readout mode, and if the corresponding mode switching configuration parameter is seamless setting0, it indicates that the image readout mode is switched from the IDCG image readout mode to the Binning image readout mode.

S615: The sensor node module sends the mode switching configuration parameter to the camera.

After determining the mode switching configuration parameter, the sensor node module may send the mode switching configuration parameter to the camera driver, and the camera driver then sends the mode switching configuration parameter to the camera.

Correspondingly, the camera may receive the mode switching configuration parameter sent by the sensor node module.

S616: The camera stores the mode switching configuration parameter in a register included in the image sensor.

After receiving the mode switching configuration parameter sent by the sensor node module, the camera may store the mode switching configuration parameter in the register included in the image sensor.

S617: The camera updates, based on the mode switching configuration parameter, the current image readout mode from the image readout mode C1 to the target switching mode.

The camera may apply the configuration parameter of the target switching mode based on the register sequence included in the mode switching configuration parameter. That is to say, the camera may adjust the configuration parameter of the currently applied image readout mode from the configuration parameter of the image readout mode C1 to the configuration parameter of the target switching mode.

S618: The camera captures raw image data based on the target image readout mode.

After updating the current image readout mode, the camera may capture the raw image data based on the updated image readout mode. In other words, the camera can capture the raw image data based on the target image readout mode. Correspondingly, other software and hardware modules in the electronic device may process the raw image data and finally display the processed raw image data on the display screen.

In some embodiments of this application, the electronic device may determine one or more of an adaptive dynamic range compression gain, dark area luma information, and ambient luma (that is, AdrcGain, DarkLuma, and LV) based on the image data P1-1, and determine, based on the determined one or more items of content, whether the current scene is an HDR scene, to obtain an HDR scene determination result. Specifically, when step S607 and step S608 are performed, the automatic exposure control module may determine one or more of an adaptive dynamic range compression gain, dark area luma information, and ambient luma based on the image data P1-1, and send the determined one or more items of content to the perception engine. In addition, when step S609 is performed, the perception engine may determine, based on the one or more items of content, whether the current scene is an HDR scene, and obtain an HDR scene determination result.

Using the adaptive dynamic range compression gain and the ambient luma as an example for description, the electronic device may determine AdrcGain and LV based on the image data P1-1, and determine, based on AdrcGain and LV, whether the current scene is an HDR scene.

In a possible implementation, the electronic device may determine whether AdrcGain and LV satisfy the HDR scene entry condition and the HDR scene exit condition. When AdrcGain and LV satisfy the HDR scene entry condition, the electronic device may determine that the current scene is an HDR scene, and obtain a corresponding HDR scene determination result. When AdrcGain and LV satisfy the HDR scene exit condition, the electronic device may determine that the current scene is not an HDR scene, and obtain a corresponding HDR scene determination result. When AdrcGain and LV neither satisfy the HDR scene entry condition nor the HDR scene exit condition, the perception engine may determine that the current scene is consistent with a previously determined scene, that is, the HDR scene determination result obtained this time is consistent with the HDR scene determination result obtained last time.

The HDR scene entry condition may include: AdrcGain is greater than the gain threshold Z1 and LV is greater than the ambient luma threshold H1. The HDR scene exit condition may include: AdrcGain is less than the gain threshold Z2 and LV is less than the ambient luma threshold H2. It may be understood that, Z1>Z2, and H1>H2.

In another possible implementation, when AdrcGain is greater than the gain threshold Z1 and LV is greater than the ambient luma threshold H1, the electronic device may determine that the current scene is an HDR scene, and obtain a corresponding HDR scene determination result. Otherwise, the electronic device may determine that the current scene is not an HDR scene, and obtain a corresponding HDR scene determination result.

Similarly, Using the dark area luma information and the ambient luma as an example for description, the electronic device may determine DarkLuma and LV based on the image data P1-1, and determine, based on DarkLuma and LV, whether the current scene is an HDR scene.

In a possible implementation, the electronic device may determine whether DarkLuma and LV satisfy the HDR scene entry condition and the HDR scene exit condition. When DarkLuma and LV satisfy the HDR scene entry condition, the electronic device may determine that the current scene is an HDR scene, and obtain a corresponding HDR scene determination result. When DarkLuma and LV satisfy the HDR scene exit condition, the electronic device may determine that the current scene is not an HDR scene, and obtain a corresponding HDR scene determination result. When DarkLuma and LV neither satisfy the HDR scene entry condition nor the HDR scene exit condition, the perception engine may determine that the current scene is consistent with a previously determined scene, that is, the HDR scene determination result obtained this time is consistent with the HDR scene determination result obtained last time.

The HDR scene entry condition may include: DarkLuma is less than the dark area luma threshold A1 and LV is greater than the ambient luma threshold H1. The HDR scene exit condition may include: DarkLuma is greater than the dark area luma threshold A2 and LV is less than the ambient luma threshold H2. It may be understood that, $A1<A2$, and $H1>H2$.

In another possible implementation, when DarkLuma is less than the dark area luma threshold A1 and LV is greater than the ambient luma threshold H1, the electronic device may determine that the current scene is an HDR scene, and obtain a corresponding HDR scene determination result. Otherwise, the electronic device may determine that the current scene is not an HDR scene, and obtain a corresponding HDR scene determination result.

Similarly, Using the ambient luma as an example for description, the electronic device may determine current ambient luma based on the image data P1-1, and determine, based on the current ambient luma, whether the current scene is an HDR scene. In a possible implementation, If the current ambient luma is greater than the ambient luma threshold H1, the electronic device may determine that the current scene is an HDR scene. Otherwise, the electronic device may determine that the current scene is not an HDR scene. In another possible implementation, If the current ambient luma is greater than the ambient luma threshold H1, the electronic device may determine that the current scene is an HDR scene, and obtain an HDR scene determination result. If the current ambient luma is less than the ambient luma threshold H2, the electronic device may determine that the current scene is not an HDR scene, and obtain an HDR scene determination result. If the current ambient luma is between the ambient luma threshold H1 and the ambient luma threshold H2 (including the ambient luma threshold H1 and the ambient luma threshold H2), the HDR scene determination result that the electronic device may obtain is the same as the HDR scene determination result obtained last time.

It should be noted that the electronic device may further obtain another type of luma information based on the image data P1-1, and determine, based on the another type of luma information, whether the current scene is an HDR scene. For example, the another type of luma information may include a difference between luma of a dark area in the image data P1-1 and the average luma, and may further include a difference between luma of a light area in the image data P1-1 and the average luma.

In some embodiments of this application, the electronic device may determine the target image readout mode based on the current camera mode and the HDR scene determination result, without considering the zoom ratio. Specifically, when step S601 and step S602 are performed, the camera application may determine a current camera mode, and send the current camera mode to the decision module. When step S611 is performed, the decision module may determine the target image readout mode based on the current camera mode and the HDR scene determination result. Specifically, a correspondence among a camera mode, an HDR scene determination result, and an image readout mode may be pre-stored in the electronic device. The decision module may search, in the correspondence, for an image readout mode corresponding to the current camera mode and the received HDR scene determination result. The image readout mode is the target image readout mode determined by the decision module. It may be understood that, a correspondence among a camera mode, an HDR scene determination result, and an image readout mode may be set according to an actual requirement. This is not limited in this application.

For example, as shown in Table 2, when the camera mode is the ordinary photographing mode, if the current scene is an HDR scene, the corresponding drawing image readout mode is the Remosaic drawing image readout mode; and if the current scene is not an HDR scene, the corresponding drawing image readout mode is the Binning drawing image readout mode. When the camera mode is the HDR video recording mode, if the current scene is an HDR scene, the corresponding drawing image readout mode is the IDCG drawing image readout mode; and if the current scene is not an HDR scene, the corresponding drawing image readout mode is the Binning drawing image readout mode.

TABLE 2

| Camera mode | HDR scene determination result | Image readout mode |
|---|---|---|
| Ordinary photographing mode | Yes | Remosaic |
| Ordinary photographing mode | No | Binning |
| HDR video recording mode | Yes | IDCG |
| HDR video recording mode | No | Binning |
| ... | ... | ... |

Certainly, Table 2 is merely an example, and a correspondence among a camera mode, an HDR scene determination result, and an image readout mode is not limited to content shown in Table 2.

In some embodiments of this application, the electronic device may further determine the target image readout mode based on the current camera mode and the zoom ratio, without considering the HDR scene determination result. For specific implementations, reference may be made to the foregoing, and details are not described herein again.

Certainly, the electronic device may also determine the target image readout mode based on other factors (for example, a size of a photographed object in a picture, and a movement state of the photographed object). This is not limited in this application.

Based on FIG. 5, FIG. 6A(1), FIG. 6A(2), and FIG. 6A(3), it can be learned that, after the camera application is started, the electronic device may load configuration parameters of all image readout modes in a default camera mode, and apply a configuration parameter of a default image readout mode in the default camera mode, to capture an image based on the default image readout mode in the default camera mode. In the default camera mode, the electronic device may load a mode switching configuration parameter, and switch, based on the mode switching configuration parameter, the configuration parameter of the currently applied image readout mode from the configuration parameter of the image readout mode C1 to the configuration parameter of the target image readout mode. In other words, image readout mode switching can be implemented by loading the control switch configuration parameter for switching to the target image readout mode, without reloading the configuration parameter of the target image readout mode. A quantity of register sequences included in the control switch configuration parameter is less than a quantity of register sequences included in the configuration parameter of the target image readout mode, so that the electronic device can complete image readout mode switching in less time. In other words, a delay of the image readout mode switching is reduced.

Figure 6B:
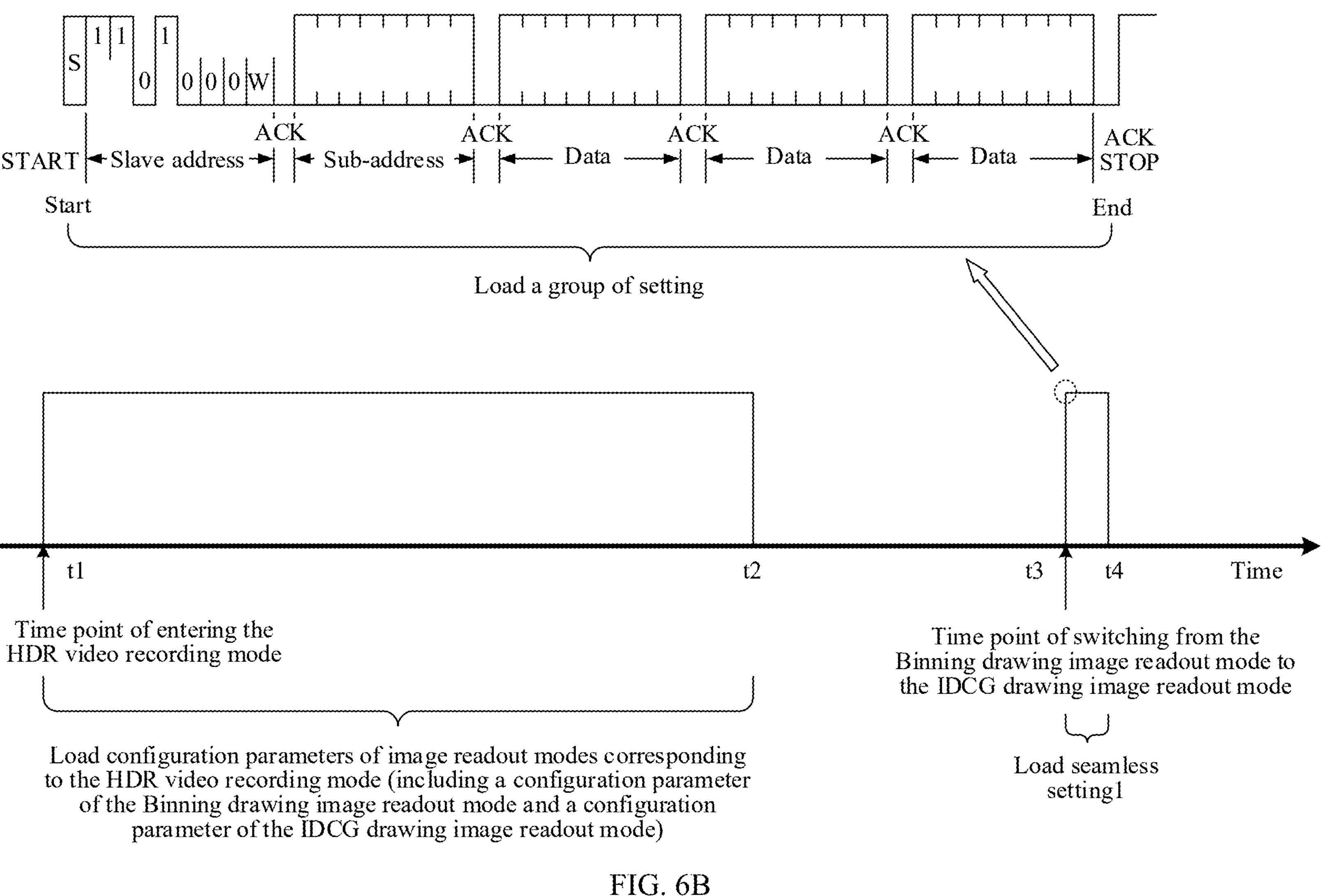
FIG. 6B is a schematic diagram of an I2C waveform of loading a configuration parameter according to an embodiment of this application.

For example, as shown in FIG. 6B, at a moment t1, the electronic device enters the HDR video recording mode, and the electronic device starts to load configuration parameters of all image readout modes corresponding to the HDR video recording mode (namely, an HDR recording FMC configuration parameter). The configuration parameters of all the image readout modes corresponding to the HDR video recording mode may include a configuration parameter of the Binning drawing image readout mode and a configuration parameter of the IDCG drawing image readout mode. At a moment t2, the electronic device ends loading of the HDR video recording FMC configuration parameter. It may be understood that, after loading of the HDR recording FMC configuration parameter is completed, the electronic device may capture an image based on the Binning image readout mode in the HDR video recording mode. At a moment t3, the electronic device starts to switch from the Binning image readout mode to the IDCG image readout mode, and the electronic device starts to load seamless setting1. In the HDR video recording mode, seamless setting1 is a mode switching configuration parameter indicating switching from the Binning image readout mode to the IDCG image readout mode. At a moment t4, the electronic device ends loading of seamless setting1. As shown in FIG. 6B, a quantity of sets of setting included in the HDR video recording FMC configuration parameter is greater than a quantity of sets of setting included in seamless setting1. setting refers to a configuration parameter. A set of setting may include at least one set of register sequences. Specifically, as shown in FIG. 6B, when loading a set of setting, the electronic device first loads a slave address (that is, slave address), then loads a sub-address (that is, sub-address), and then writes data. The slave address refers to an address of a device (for example, a camera) that is addressed by a host on an I2C bus, and sub-addresses refer to addresses of addressing devices (for example, a register in an image sensor included in the camera) of different components or storage units in the device. It should be noted that when the electronic device loads the setting included in the seamless setting1, an address of a register for controlling stream stop/stream start is not involved in loading a sub-address. That is to say, in this embodiment of this application, when the electronic device switches between image readout modes in the photographing process, there is no stream interrupt phenomenon of stream stop/stream start in the image data reported by the camera, so that a process of switching between image readout modes is faster and smoother, and usage experience of the user is improved.

Figure 7:
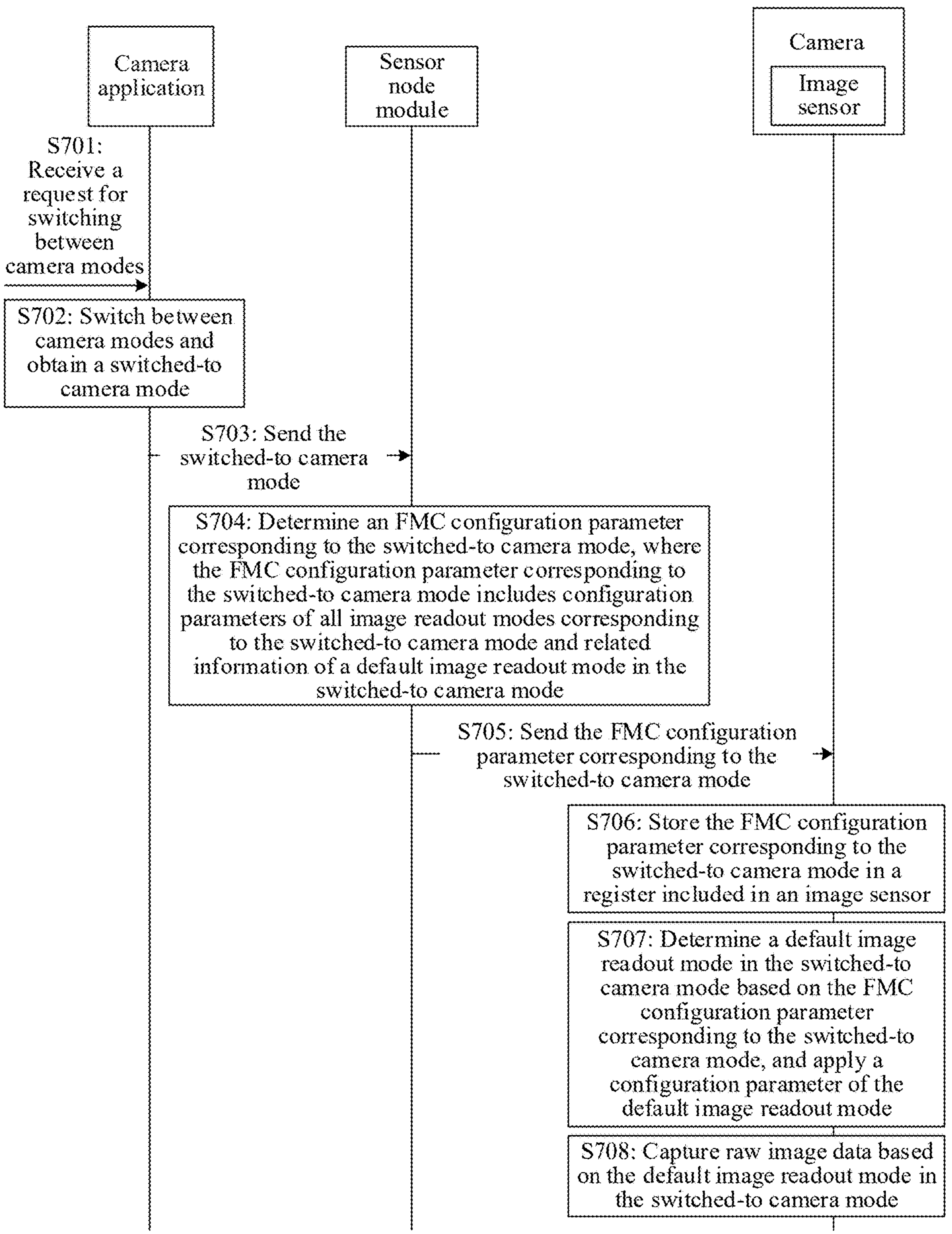
FIG. 7 is a flowchart of another image readout mode switching method according to an embodiment of this application.

3. Load Configuration Parameters of all Image Readout Modes Corresponding to a Switched-to Camera Mode after Switching Between Camera Modes (as Shown in FIG. 7)

The user may trigger switching between camera modes. Referring to FIG. 7, after switching between camera modes, the electronic device may load configuration parameters of all image readout modes corresponding to a switched-to camera mode, and the electronic device may further apply a configuration parameter of a default image readout mode in the switched-to camera mode, to capture an image based on the default image readout mode in the switched-to camera mode.

In some embodiments of this application, after performing the steps shown in FIG. 5, FIG. 6A(1), FIG. 6A(2), and FIG. 6A(3), the electronic device may further load, in response to a user operation of switching between camera modes, configuration parameters of all image readout modes corresponding to a switched-to camera mode, and capture an image based on a default image readout mode in the switched-to camera mode.

S701: The camera application receives a request for switching between camera modes.

It may be understood that, the user may trigger switching between camera modes. Correspondingly, the camera application in the electronic device may receive the request for switching between camera modes.

For example, as shown in FIG. 2C, the user may click an HDR video recording mode option 301. Correspondingly, the electronic device may receive a request for switching a camera mode to an HDR video recording mode. In response to the request for switching the camera mode to the HDR video recording mode, the electronic device may capture an image based on the HDR video recording mode (for details, refer to step S702 to step S708), and display the user interface 400 shown in FIG. 2D. It may be understood that, the user may also trigger switching between camera modes through a voice, a gesture, or the like. This application does not limit the specific manner in which the user triggers the electronic device to switch between camera modes.

S702: The camera application switches between camera modes and obtains a switched-to camera mode.

After receiving the request for switching between camera modes, the camera application may switch between camera modes, and obtain a switched-to camera mode.

S703: The camera application sends the switched-to camera mode to a sensor node module.

After determining the switched-to camera mode, the camera application may send the switched-to camera mode to the sensor node module. Specifically, the camera application may send the switched-to camera mode to the camera service, and then the camera service may send the switched-to camera mode to the sensor node module.

Correspondingly, the sensor node module may receive the switched-to camera mode sent by the camera application.

S704: The sensor node module determines an FMC configuration parameter corresponding to the switched-to camera mode. The FMC configuration parameter corresponding to the switched-to camera mode includes configuration parameters of all image readout modes corresponding to the switched-to camera mode and related information of a default image readout mode in the switched-to camera mode.

After receiving the switched-to camera mode sent by the camera application, the sensor node module may determine an FMC configuration parameter corresponding to the switched-to camera mode. The FMC configuration parameter corresponding to the switched-to camera mode may include configuration parameters of all image readout modes corresponding to the switched-to camera mode and related information of a default image readout mode in the switched-to camera mode. It may be understood that, the default drawing image readout mode in the switched-to camera mode may be preset.

For example, as shown in FIG. 2C, the user may trigger switching of the camera mode from the ordinary photographing mode to the HDR video recording mode. In other words, the switched-to camera mode is the HDR video recording mode. An FMC configuration parameter corresponding to the HDR video recording mode is an HDR recording FMC configuration parameter. The HDR recording FMC configuration parameter may include a configuration parameter of a Binning drawing image readout mode, a configuration parameter of an IDCG drawing image readout mode, and related information of a default drawing image readout mode in the HDR video recording mode.

It may be understood that, for related descriptions of step S704, reference may be made to step S508, and details are not described herein again.

S705: The sensor node module sends the FMC configuration parameter corresponding to the switched-to camera mode to a camera.

After determining the FMC configuration parameter corresponding to the switched-to camera mode, the sensor node module may send the FMC configuration parameter corresponding to the switched-to camera mode to a camera driver, and then the camera driver sends the FMC configuration parameter to the camera.

In some embodiments of this application, the camera driver may directly write the FMC configuration parameter corresponding to the switched-to camera mode to a register in an image sensor included in the camera.

Correspondingly, the camera may receive the FMC configuration parameter corresponding to the switched-to camera mode sent by the sensor node module.

S706: The camera stores the FMC configuration parameter corresponding to the switched-to camera mode in a register included in an image sensor.

After receiving the FMC configuration parameter corresponding to the switched-to camera mode sent by the sensor node module, the camera may store the FMC configuration parameter corresponding to the switched-to camera mode in the register included in the image sensor.

S707: The camera determines a default image readout mode in the switched-to camera mode based on the FMC configuration parameter corresponding to the switched-to camera mode, and applies a configuration parameter of the default image readout mode.

After receiving the FMC configuration parameter corresponding to the switched-to camera mode, the camera may determine the default image readout mode in the switched-to camera mode based on the related information of the default image readout mode included in the FMC configuration parameter, and apply the configuration parameter of the default image readout mode.

It may be understood that, for related descriptions of step S707, reference may be made to step S511, and details are not described herein again.

S708: The camera captures raw image data based on the default image readout mode in the switched-to camera mode.

After the camera determines the default image readout mode in the switched-to camera mode, the image sensor included in the camera may read out a frame according to the default image readout mode. In other words, the camera can capture the raw image data based on the default image readout mode. Correspondingly, other software and hardware modules in the electronic device may process the raw image data and finally display the processed raw image data on the display screen.

It should be noted that after the camera mode switching, the electronic device may continuously determine a target image readout mode with reference to the camera mode, a zoom ratio, and an HDR scene determination result, and adjust a current image readout mode based on the target image readout mode. That is to say, after performing the steps shown in FIG. 7, the electronic device may further perform steps shown in FIG. 6A(1), FIG. 6A(2), and FIG. 6A(3).

It may be understood that, in some embodiments of this application, based on performing the steps shown in FIG. 6A(1), FIG. 6A(2), and FIG. 6A(3), the electronic device may first determine whether the camera mode is switched before performing step S613. If the camera mode is switched, the electronic device may continue to perform step S613 to step S618 after performing step S704 to step S708. If the camera mode is not switched, the electronic device may directly continue to perform step S613 to step S618.

In some embodiments of this application, after performing step S701 to step S703, the electronic device may determine the configuration parameters of all the image readout modes corresponding to the switched-to camera mode, and first load the configuration parameter of the default image readout mode in the switched-to camera mode. After the loading is completed, the electronic device may directly apply the configuration parameter of the default image readout mode in the switched-to camera mode, that is, capture an image based on the default image readout mode in the switched-to camera mode. After loading of the configuration parameter of the default image readout mode in the switched-to camera mode is completed, the electronic device may continue to load configuration parameters of other image readout modes (different from the default image readout mode) corresponding to the switched-to camera mode.

Specifically, after receiving the switched-to camera mode sent by the camera application, the sensor node module may determine the configuration parameters of all the image readout modes corresponding to the switched-to camera mode. The sensor node module may first send the configuration parameter of the default image readout mode in the switched-to camera mode to the camera. After receiving the configuration parameter of the default image readout mode in the switched-to camera mode sent by the sensor node module, the camera may store the configuration parameter in the register included in the image sensor. In addition, the camera may directly apply the configuration parameter of the default image readout mode in the switched-to camera mode, to capture an image based on the default image readout mode in the switched-to camera mode. After sending the configuration parameter of the default image readout mode in the switched-to camera mode to the camera, the sensor node module may successively send the configuration parameters of the other image readout modes in the switched-to camera mode to the camera. After receiving the configuration parameters of the image readout modes, the camera may store the configuration parameters in the register of the image sensor.

Figure 8:
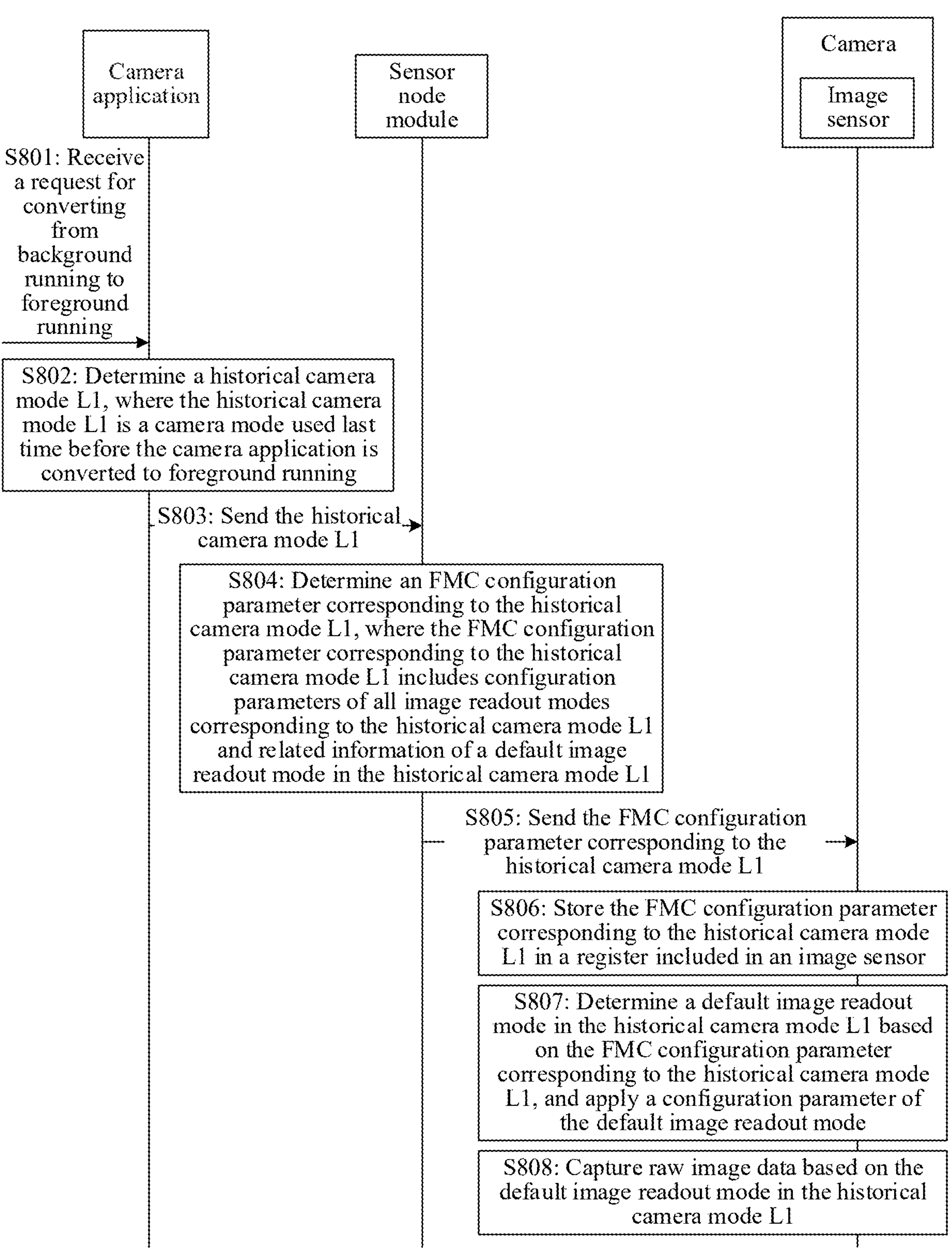
FIG. 8 is a flowchart of another image readout mode switching method according to an embodiment of this application.
Figure 9:
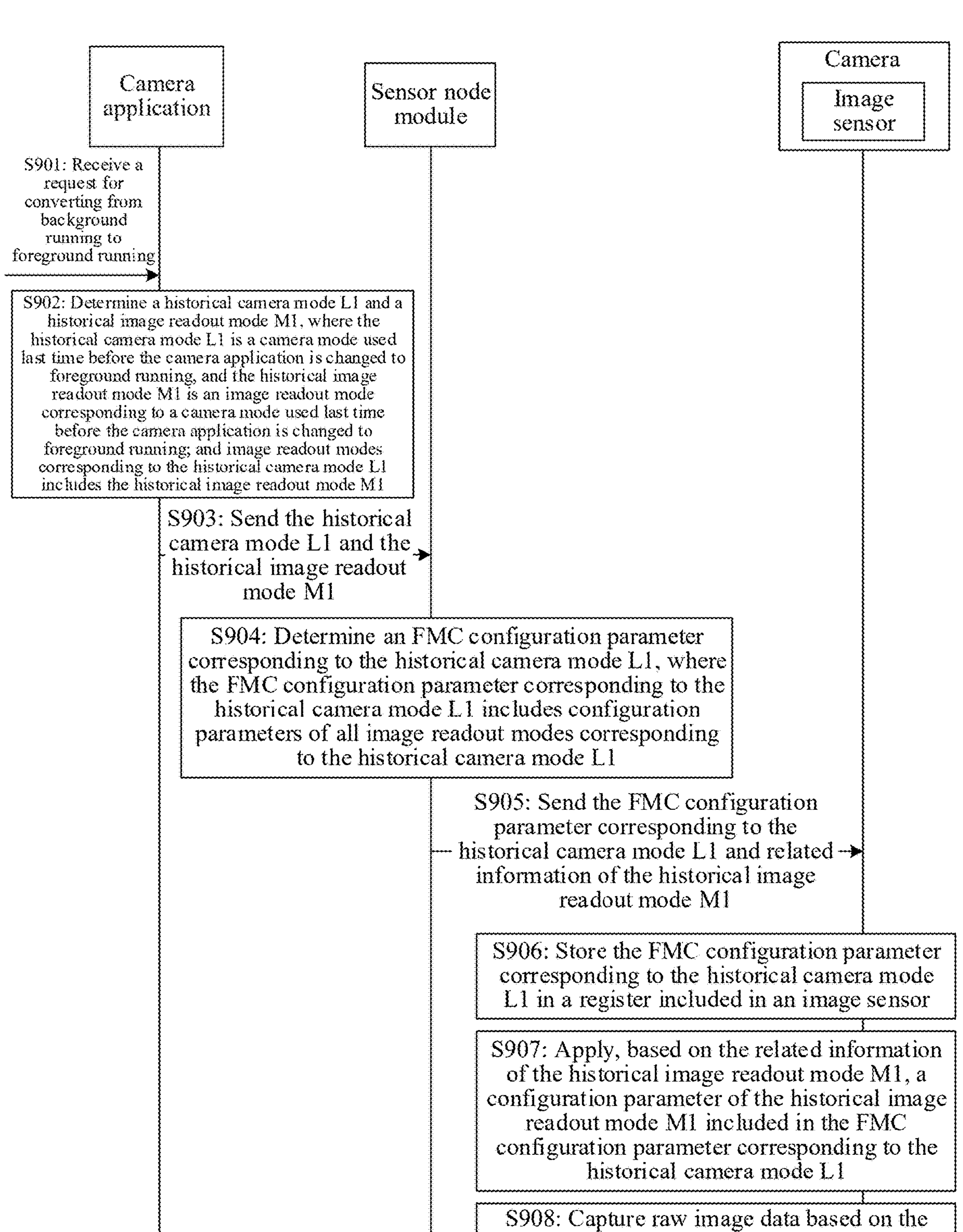
FIG. 9 is a flowchart of another image readout mode switching method according to an embodiment of this application.

4. Load Configuration Parameters of all Image Readout Modes Corresponding to a Historical Camera Mode after the Camera Application is Converted from Background Running to Foreground Running (as Shown in FIG. 8 and FIG. 9)

It may be understood that, the camera application may exit the foreground running and be converted to the background running. In this case, the user may then trigger the camera application to be converted from the background running to the foreground running. Referring to FIG. 8, after the camera application is converted from background running to foreground running, configuration parameters of all image readout modes corresponding to a historical camera mode may be loaded, and the electronic device may further apply a configuration parameter of a default image readout mode in the historical camera mode, to capture an image based on the default image readout mode in the historical camera mode.

S801: The camera application receives a request for converting from background running to foreground running.

It may be understood that, when the camera application is in the background running state, the user may trigger the camera application to change to foreground running. Correspondingly, the camera application may receive a request to change from background running to foreground running.

For example, as shown in FIG. 2E, the user may click the task card 501. Correspondingly, the electronic device may receive a request for converting the camera application from background running to foreground running. In response to the request for converting the camera application from background running to foreground running, the electronic device may capture an image based on the historical camera mode and the historical image readout mode (for details, refer to step S802 to step S808), and display the user interface 600 shown in FIG. 2F. It may be understood that, the user may alternatively convert the camera application from background running to foreground running through a voice, a gesture, or the like. This application does not limit the specific manner in which the user triggers the electronic device to convert the camera application from background running to foreground running.

It may be understood that, after performing step S801, the electronic device may further perform step S501 to step S505.

S802: The camera application determines a historical camera mode L1. The historical camera mode L1 is a camera mode used last time before the camera application is converted to foreground running.

After receiving the request to change from background running to foreground running, the camera application may determine a historical camera mode L1. The historical camera mode L1 is a camera mode used last time before the camera application is converted to foreground running.

It may be understood that, the historical camera mode L1 may be an ordinary photographing mode or an HDR video recording mode. Certainly, the historical camera mode L1 may be another camera mode. This is not limited in this application.

S803: The camera application sends the historical camera mode L1 to a sensor node module.

After determining the historical camera mode L1, the camera application may send the historical camera mode L1 to the sensor node module.

Correspondingly, the sensor node module may receive the historical camera mode L1 sent by the camera application.

S804: The sensor node module determines an FMC configuration parameter corresponding to the historical camera mode L1. The FMC configuration parameter corresponding to the historical camera mode L1 includes configuration parameters of all image readout modes corresponding to the historical camera mode L1 and related information of a default image readout mode in the historical camera mode L1.

After receiving the historical camera mode L1 sent by the camera application, the sensor node module may further determine an FMC configuration parameter corresponding to the historical camera mode L1. The FMC configuration parameter corresponding to the historical camera mode L1 includes configuration parameters of all image readout modes corresponding to the historical camera mode L1 and related information of a default image readout mode in the historical camera mode L1. It may be understood that, for related descriptions of the default image readout mode, reference may be made to the foregoing, and details are not described herein again.

For example, the historical camera mode L1 may be an ordinary photographing mode. The FMC configuration parameter corresponding to the ordinary photographing mode is an ordinary photographing FMC configuration parameter. The ordinary photographing FMC configuration parameter may include a configuration parameter of a Binning drawing image readout mode, a configuration parameter of a Remosaic drawing image readout mode, and related information of a default drawing image readout mode in the ordinary photographing mode.

For example, the historical camera mode L1 may be an HDR video recording mode. An FMC configuration parameter corresponding to the HDR video recording mode is an HDR recording FMC configuration parameter. The HDR recording FMC configuration parameter may include a configuration parameter of a Binning drawing image readout mode, a configuration parameter of an IDCG drawing image readout mode, and related information of a default drawing image readout mode in the HDR video recording mode.

It may be understood that, for related descriptions of step S803, reference may be made to step S508 and step S704, and details are not described herein again.

S805: The sensor node module sends the FMC configuration parameter corresponding to the historical camera mode L1 to a camera.

After determining the FMC configuration parameter corresponding to the historical camera mode L1, the sensor node module may send the FMC configuration parameter corresponding to the historical camera mode L1 to a camera driver, and then the camera driver sends the FMC configuration parameter to the camera.

In some embodiments of this application, the camera driver may directly write the FMC configuration parameter corresponding to the historical camera mode L1 to a register in an image sensor included in the camera.

Correspondingly, the camera may receive the FMC configuration parameter corresponding to the historical camera mode L1 sent by the sensor node module.

S806: The camera stores the FMC configuration parameter corresponding to the historical camera mode L1 in a register included in an image sensor.

S807: The camera determines a default image readout mode in the historical camera mode L1 based on the FMC configuration parameter corresponding to the historical camera mode L1, and applies a configuration parameter of the default image readout mode.

S808: The camera captures raw image data based on the default image readout mode in the historical camera mode L1.

It may be understood that, for related descriptions of step S806 to step S808, reference may be made to step S510 to step S512 and step S706 to step S708.

In some embodiments of this application, after performing the steps shown in FIG. 5, FIG. 6A(1), FIG. 6A(2), and FIG. 6A(3), the electronic device may further perform the steps shown in FIG. 8.

In some embodiments of this application, after performing the steps shown in FIG. 5 to FIG. 7, the electronic device may further perform the steps shown in FIG. 8.

In some embodiments of this application, after performing step S801 to step S803, the electronic device may determine the configuration parameters of all the image readout modes corresponding to the historical camera mode L1, and first load the configuration parameter of the default image readout mode in the historical camera mode L1. After the loading is completed, the electronic device may directly apply the configuration parameter of the default image readout mode in the historical camera mode L1, that is, capture an image based on the default image readout mode in the historical camera mode L1. After loading of the configuration parameter of the default image readout mode in the historical camera mode L1 is completed, the electronic device may continue to load configuration parameters of other image readout modes (different from the default image readout mode) corresponding to the historical camera mode L1.

Specifically, after receiving the historical camera mode L1 sent by the camera application, the sensor node module may determine the configuration parameters of all the image readout modes corresponding to the historical camera mode L1. The sensor node module may first send the configuration parameter of the default image readout mode in the historical camera mode L1 to the camera. After receiving the configuration parameter of the default image readout mode in the historical camera mode L1 sent by the sensor node module, the camera may store the configuration parameter in the register included in the image sensor. In addition, the camera may directly apply the configuration parameter of the default image readout mode in the historical camera mode L1, to capture an image based on the default image readout mode in the historical camera mode L1. After sending the configuration parameter of the default image readout mode in the historical camera mode L1 to the camera, the sensor node module may successively send the configuration parameters of the other image readout modes in the historical camera mode L1 to the camera. After receiving the configuration parameters of the image readout modes, the camera may store the configuration parameters in the register of the image sensor.

It may be understood that, the camera application may exit the foreground running and be converted to the background running. In this case, the user may then trigger the camera application to be converted from the background running to the foreground running. Referring to FIG. 9, after the camera application is converted from background running to foreground running, configuration parameters of all image readout modes corresponding to a historical camera mode may be loaded. All the image readout modes corresponding to the historical camera mode may include a historical image readout mode. The electronic device may further apply a configuration parameter of the historical image readout mode, to collect an image based on the historical image readout mode.

S901: The camera application receives a request for converting from background running to foreground running.

It may be understood that, for related descriptions of step S901, reference may be made to step S801, and details are not described herein again.

For example, as shown in FIG. 2E, the user may click the task card 501. Correspondingly, the electronic device may receive a request for converting the camera application from background running to foreground running. In response to the request for converting the camera application from background running to foreground running, the electronic device may capture an image based on the default image readout mode in the historical camera mode (for details, refer to step S902 to step S908), and display the user interface 600 shown in FIG. 2F. It may be understood that, the user may alternatively convert the camera application from background running to foreground running through a voice, a gesture, or the like. This application does not limit the specific manner in which the user triggers the electronic device to convert the camera application from background running to foreground running.

It may be understood that, after performing step S901, the electronic device may further perform step S501 to step S505.

S902: The camera application determines a historical camera mode L1 and a historical image readout mode M1. The historical camera mode L1 is a camera mode used last time before the camera application is changed to foreground running, and the historical image readout mode M1 is an image readout mode corresponding to a camera mode used last time before the camera application is changed to foreground running. Image readout modes corresponding to the historical camera mode L1 includes the historical image readout mode M1.

After receiving the request for converting from background running to foreground running, the camera application may determine a historical camera mode L1 and a historical image readout mode M1. The historical camera mode L1 is a camera mode used last time before the camera application is changed to foreground running, and the historical image readout mode M1 is an image readout mode corresponding to a camera mode used last time before the camera application is changed to foreground running. It may be understood that, the image readout modes corresponding to the historical camera mode L1 may include the historical image readout mode M1.

It may be understood that, the history image readout mode M1 may be the foregoing mode1.

S903: The camera application sends the historical camera mode L1 and the historical image readout mode M1 to a sensor node module.

After determining the historical camera mode L1 and the historical image readout mode M1, the camera application may send the historical camera mode L1 and the historical image readout mode M1 to the sensor node module.

It may be understood that, the camera application may transmit related information of the historical image readout mode M1 to the sensor node module. The related information of the historical image readout mode M1 may include an identifier of the historical image readout mode. For related descriptions of the identifier of the image readout mode, reference may be made to the foregoing, and details are not described herein again.

For example, after the camera application starts and enters an ordinary photographing mode, the electronic device may capture an image based on a Binning image readout mode (as shown in FIG. 5). Then, the camera application may be converted from foreground running to background running. It may be understood that, the camera application may then be converted from background running to foreground running. In this case, the historical camera mode L1 is the ordinary photographing mode, and the historical image readout mode M1 may be the Binning image readout mode.

For example, after the camera application starts and enters an ordinary photographing mode, the electronic device may collect an image based on a Binning image readout mode, or may switch the drawing image readout mode from the Binning drawing image readout mode to a Remosaic drawing image readout mode (as shown in FIG. 6A(1), FIG. 6A(2), and FIG. 6A(3)). Then, the camera application may be converted from foreground running to background running. It may be understood that, the camera application may then be converted from background running to foreground running. In this case, the historical camera mode L1 is the ordinary photographing mode, and the historical image readout mode M1 may be the Remosaic image readout mode.

For example, after the camera application starts and enters an ordinary photographing mode, the electronic device may collect an image based on a Binning image readout mode, or may switch the camera mode to an HDR video recording mode and capture an image based on an IDCG video image readout mode. Then, the camera application may be converted from foreground running to background running. It may be understood that, the camera application may then be converted from background running to foreground running. In this case, the historical camera mode L1 is the HDR video recording mode, and the historical image readout mode M1 may be the IDCG image readout mode.

For example, after the camera application starts and enters an ordinary photographing mode, the electronic device may collect an image based on a Binning image readout mode, or may switch the camera mode to an HDR video recording mode, collect an image based on an IDCG video image readout mode, and then switch the drawing image readout mode from the IDCG drawing image readout mode to a Binning drawing image readout mode (as shown in FIG. 6A(1), FIG. 6A(2), and FIG. 6A(3)). Then, the camera application may be converted from foreground running to background running. It may be understood that, the camera application may then be converted from background running to foreground running. In this case, the historical camera mode L1 is the HDR video recording mode, and the historical image readout mode M1 may be the Binning image readout mode.

Correspondingly, the sensor node module may receive the historical camera mode L1 and the historical image readout mode M1 that are sent by the camera application.

S904: The sensor node module determines an FMC configuration parameter corresponding to the historical camera mode L1. The FMC configuration parameter corresponding to the historical camera mode L1 includes configuration parameters of all image readout modes corresponding to the historical camera mode L1.

It may be understood that, for related descriptions of step S904, reference may be made to step S803, step S508, and step S704, and details are not described herein again.

S905: The sensor node module sends the FMC configuration parameter corresponding to the historical camera mode L1 and related information of the historical image readout mode M1 to a camera.

After determining the FMC configuration parameter corresponding to the historical camera mode L1, the sensor node module may send the FMC configuration parameter corresponding to the historical camera mode L1 to the camera. After receiving the historical image readout mode M1 transmitted by the camera application, the sensor node module may further transmit the related information of the historical image readout mode M1 to the camera.

Correspondingly, the camera may receive the FMC configuration parameter corresponding to the historical camera mode L1 and the related information of the historical image readout mode M1 that are transmitted by the sensor node module.

S906: The camera stores the FMC configuration parameter corresponding to the historical camera mode L1 in a register included in an image sensor.

It may be understood that, for related descriptions of step S906, reference may be made to step S806, and details are not described herein again.

S907: The camera applies, based on the related information of the historical image readout mode M1, a configuration parameter of the historical image readout mode M1 included in the FMC configuration parameter corresponding to the historical camera mode L1.

The camera may determine, based on the related information of the historical image readout mode M1, the configuration parameter of the historical image readout mode M1 in the FMC configuration parameter corresponding to the historical camera mode L1. The image sensor in the camera may apply the configuration parameter of the historical image readout mode M1.

S908: The camera captures raw image data based on the historical image readout mode M1.

After applying the configuration parameter of the historical image readout mode M1, the image sensor may read out a frame based on the configuration parameter of the historical image readout mode M1. In other words, the camera can capture the raw image data based on the historical image readout mode M1. Correspondingly, other software and hardware modules in the electronic device may process the raw image data and finally display the processed raw image data on the display screen.

In some embodiments of this application, after performing step S901 to step S903, the electronic device may determine the configuration parameters of all the image readout modes corresponding to the historical camera mode L1, and first load the configuration parameter of the historical image readout mode M1 in the historical camera mode L1. After the loading is completed, the electronic device may directly apply the configuration parameter of the historical image readout mode M1, that is, capture an image based on the historical image readout mode M1 in the historical camera mode L1. After loading of the configuration parameter of the historical image readout mode M1 in the historical camera mode L1 is completed, the electronic device may continue to load configuration parameters of other image readout modes (different from the historical image readout mode M1) corresponding to the historical camera mode L1.

Specifically, after receiving the historical camera mode L1 and the historical image readout mode M1 that are sent by the camera application, the sensor node module may determine the configuration parameters of all the image readout modes corresponding to the historical camera mode L1. The sensor node module may first send the configuration parameter of the historical image readout mode M1 in the historical camera mode L1 to the camera. After receiving the configuration parameter of the historical image readout mode M1 in the historical camera mode L1 sent by the sensor node module, the camera may store the configuration parameter in the register included in the image sensor. In addition, the camera may directly apply the configuration parameter of the historical image readout mode M1, to capture an image based on the historical image readout mode M1 in the historical camera mode L1. After sending the configuration parameter of the historical image readout mode M1 in the historical camera mode L1 to the camera, the sensor node module may successively send the configuration parameters of the other image readout modes in the historical camera mode L1 to the camera. After receiving the configuration parameters of the image readout modes, the camera may store the configuration parameters in the register of the image sensor.

It may be understood that, after performing the steps shown in FIG. 8 or FIG. 9, the electronic device may perform the steps shown in FIG. 6A(1), FIG. 6A(2), and FIG. 6A(3), or may perform the steps shown in FIG. 7.

The foregoing embodiments only use the ordinary photographing mode and the HDR video recording mode as an example for description. It may be understood that the foregoing embodiments may also be applied to other camera modes such as a night scene mode and a portrait photographing mode.

A hardware structure of an electronic device provided in the embodiments of this application is described below.

Figure 10:
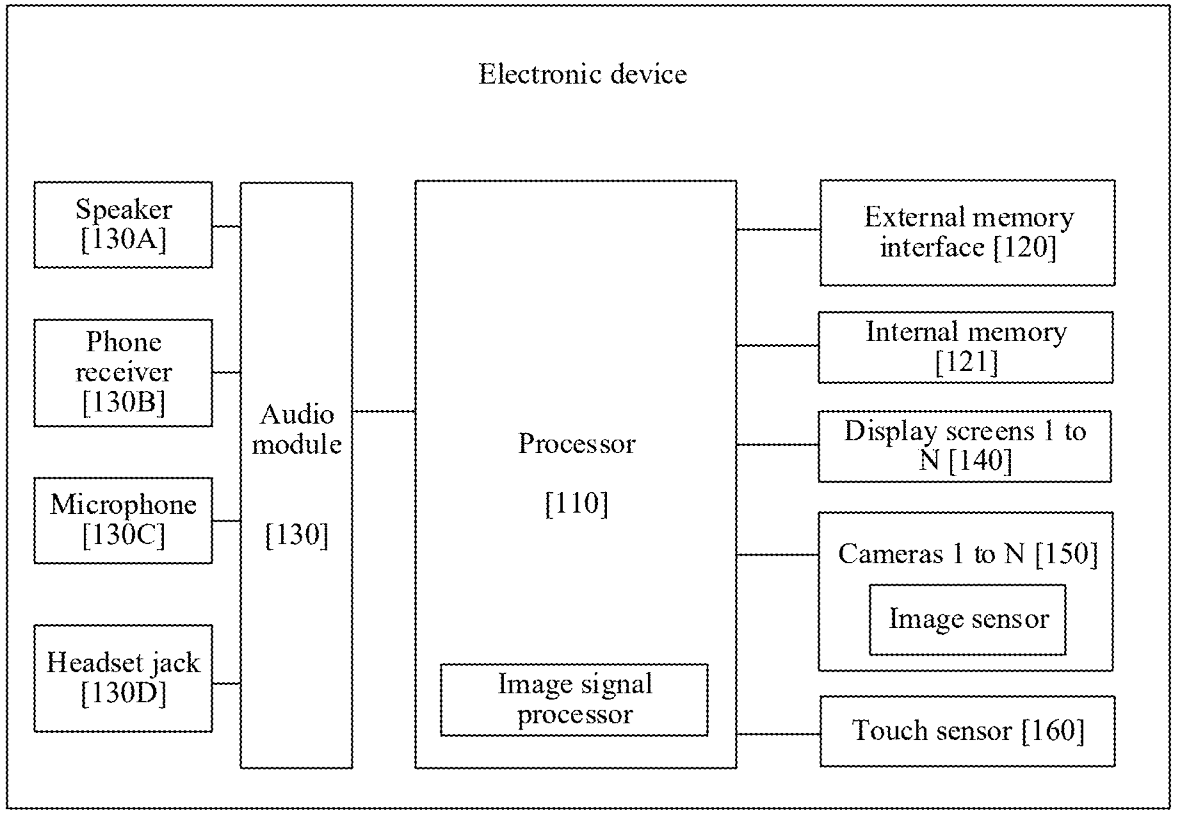
FIG. 10 is a schematic diagram of a hardware structure of an electronic device according to an embodiment of this application.

FIG. 10 is a schematic diagram of a hardware structure of an electronic device according to an embodiment of this application.

The electronic device may include a processor 110, an external memory interface 120, an internal memory 121, an audio module 130, a speaker 130A, a phone receiver 130B, a microphone 130C, a headset jack 130D, a display screen 140, a camera 150, and a touch sensor 160.

The structure shown in this embodiment of the present invention does not constitute a specific limitation on the electronic device. In some other embodiments of this application, the electronic device may include more or fewer components than those shown in the figure, or some components may be combined, or some components may be split, or a different component deployment may be used. The components shown in the figure may be implemented by hardware, software, or a combination of software and hardware. An interface connection relationship between the modules illustrated in this embodiment of the present invention is merely an example for description, and does not constitute a limitation on a structure of the electronic device.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, and/or a neural-network processing unit (Neural-network Processing Unit, NPU). A memory may be further disposed in the processor 110, and is configured to store instructions and data.

In some embodiments, the processor 110 may include one or more interfaces, for example, an inter-integrated circuit (Inter-integrated Circuit, I2C) interface, a mobile industry processor interface (Mobile Industry Processor Interface, MIPI), an inter-integrated circuit sound (Inter-integrated Circuit Sound, I2S) interface, a pulse code modulation (Pulse Code Modulation, PCM) interface, a universal asynchronous receiver/transmitter (Universal Asynchronous Receiver/Transmitter, UART) interface, a general-purpose input/output (General-Purpose Input/Output, GPIO) interface, a subscriber identity module (Subscriber Identity Module, SIM) interface, and/or a universal serial bus (Universal Serial Bus, USB) interface.

The I2C is a bidirectional synchronous serial bus, including a serial data line (Serial Data Line, SDA) and a serial clock line (Derail Clock Line, SCL). In some embodiments, the processor 110 may include a plurality of groups of I2C buses. The processor 110 may be coupled to the touch sensor 160, a charger, a flash light, the camera 150, and the like by using different I2C bus interfaces. For example, the processor 110 may be coupled to the touch sensor 160 by using the I2C interface, so that the processor 110 communicates with the touch sensor 160 by using the I2C bus interface, to implement a touch function of the electronic device 100.

It should be noted that the camera driver may update a configuration parameter into a register included in an image sensor through the I2C interface. It may be understood that, in this application, a specific manner of updating a configuration parameter of an image readout mode into the register included in the image sensor may be direct write, burst, or sequence.

The MIPI interface may be configured to connect the processor 110 to peripheral devices such as the display screen 140 and the camera 150. The MIPI interface includes a camera serial interface (Camera Serial Interface, CSI), a display serial interface (Display Serial Interface, DSI), and the like. In some embodiments, the processor 110 communicates with the camera 150 by using the CSI interface, to implement a photographing function of the electronic device 100. The processor 110 communicates with the display screen 140 by using a DSI interface, to implement a display function of the electronic device 100.

The electronic device may implement a display function by using the GPU, the display screen 140, the application processor, and the like. The GPU is a microprocessor for image processing, and is connected to the display screen 140 and the application processor. The GPU is configured to perform mathematical and geometric calculation, and is configured to render graphics. The processor 110 may include one or more GPUs, and execute program instructions to generate or change display information. For related descriptions of the display screen 140, reference may be made to the foregoing. Details are not described herein. In some embodiments, the electronic device may include one or more display screens 140.

In this embodiment of this application, a capability of the electronic device to display an image captured by the camera and user interfaces shown in FIG. 2A to FIG. 2F depends on display functions provided by the GPU, the display screen 140, and the application processor.

The electronic device may implement a photographing function by using the ISP, the camera 150, the video codec, the GPU, the display screen 140, the application processor, and the like.

The camera 150 is configured to capture a static image or a video. For related descriptions of the camera 150, reference may be made to the foregoing. Details are not described herein.

In this embodiment of this application, the electronic device implements camera application-based photographing by first relying on an image captured by the camera 150 and processed by the ISP and then relying on the video codec and image calculation and processing capabilities provided by the GPU.

The internal memory 121 may include one or more random access memories (Random Access Memories, RAMs) and one or more non-volatile memories (Non-Volatile Memories, NVMs). The random access memory may be directly read and written by the processor 110, may be configured to store executable programs (for example, machine instructions) of an operating system or other running programs, or may be configured to store data of users and applications. The non-volatile memory may also store the executable programs, the data of the users and the applications, and the like, and may be loaded into the random access memory in advance for the processor 110 to perform direct reading and writing.

In this embodiment of this application, Code for implementing the image readout mode switching method described in the embodiments of this application may be stored in a non-volatile memory. When running the camera application, the electronic device may load the executable code stored in the non-volatile memory into the random access memory.

The external memory interface 120 may be configured to connect to an external non-volatile memory, to expand a storage capability of the electronic device.

The electronic device may implement an audio function by using the audio module 130, the speaker 130A, the phone receiver 130B, the microphone 130C, the headset jack 130D, the application processor, and the like.

The audio module 130 is configured to convert digital audio information into an analog audio signal output, and is further configured to convert an analog audio input into a digital audio signal. The speaker 130A, also referred to as a "speaker", is configured to convert an audio electrical signal into a sound signal. The phone receiver 130B, also referred to as a "receiver", is configured to convert an audio electrical signal into a sound signal. The microphone 130C, also referred to as a "mouthpiece" or a "megaphone", is configured to convert a sound signal into an electrical signal. The headset jack 130D is configured to connect to a wired headset.

In this embodiment of this application, During the process of enabling the camera to capture an image, the electronic device may simultaneously enable the microphone 130C to capture a sound signal, and convert the sound signal into an electrical signal for storage. In this way, the user can obtain a video with audio.

The touch sensor 160 is also referred to as a "touch device". The touch sensor 160 may be disposed in the display screen 140, and the touch sensor 160 and the display screen 140 constitute a "touchscreen". The touch sensor 160 is configured to detect a touch operation performed on or near the touch sensor. The touch sensor may send the detected touch operation to the application processor, to determine a touch event type. Visual output related to the touch operation may be provided by using the display screen 140. In some other embodiments, the touch sensor 160 may be alternatively disposed on a surface of the electronic device, and is located on a position different from that of the display screen 140.

In this embodiment of this application, the electronic device may detect, by using the touch sensor 160, an operation such as a click or a slide acting on the display screen 140 by the user, to implement the image readout mode switching method shown in FIG. 2A to FIG. 2F.

The foregoing embodiments are merely intended for describing the technical solutions of this application, but not for limiting this application. Although this application is described in detail with reference to the foregoing embodiments, a person of ordinary skill in the art is to understand that modifications may still be made to the technical solutions described in the foregoing embodiments or equivalent replacements may be made to some technical features thereof, as long as such modifications or replacements do not cause the essence of corresponding technical solutions to depart from the scope of the technical solutions of the embodiments of this application.

The invention claimed is:

1. A method, comprising:

loading a first configuration parameter of a first image readout mode and a second configuration parameter of a second image readout mode when an electronic device enters a first camera mode of a camera application;

displaying a first user interface of the camera application, wherein the first user interface comprises a first preview window, and the first preview window comprises a first preview image captured by the electronic device based on the first image readout mode;

loading a third configuration parameter for switching between image readout modes when a switching condition for switching from the first image readout mode to the second image readout mode is satisfied, wherein the third configuration parameter is configured to instruct to switch from the first image readout mode to the second image readout mode, and a quantity of register sequences in the third configuration parameter is less than a quantity of register sequences in the second configuration parameter; and displaying a second user interface of the camera application, wherein the second user interface comprises a second preview window, and the second preview window comprises a second preview image captured by the electronic device based on the second image readout mode.

2. The method of claim 1, wherein before loading the third configuration parameter, the method further comprises:

obtaining a first high dynamic range (HDR) scene determination result, based on luma information of the first preview image, of whether a current scene is an HDR scene; and searching, based on a correspondence among a camera mode, an HDR scene determination result, and an image readout mode, for an image readout mode corresponding to the first camera mode and the first HDR scene determination result, wherein a found image readout mode is a target image readout mode, wherein satisfying the switching condition for switching from the first image readout mode to the second image readout mode comprises the target image readout mode being the second image readout mode.

3. The method of claim 1, wherein before loading the third configuration parameter, the method further comprises:

obtaining a first high dynamic range (HDR) scene determination result, based on luma information of the first preview image, of whether a current scene is an HDR scene; and searching, based on a correspondence among a camera mode, a zoom ratio, an HDR scene determination result, and an image readout mode, for an image readout mode corresponding to the first camera mode, a current zoom ratio, and the first HDR scene determination result, wherein a found image readout mode is a target image readout mode, wherein satisfying the switching condition for switching from the first image readout mode to the second image readout mode comprises the target image readout mode being the second image readout mode.

4. The method according to claim 2, wherein whether an HDR scene entry condition is satisfied is based on a first adaptive dynamic range compression gain, first dark area luma information, and first ambient luma based on the luma information of the first preview image, and wherein whether an HDR scene exit condition is satisfied is based on the first adaptive dynamic range compression gain, the first dark area luma information, and the first ambient luma, wherein the current scene is the HDR scene, when the first adaptive dynamic range compression gain, the first dark area luma information, and the first ambient luma satisfy the HDR scene entry condition, wherein when the current scene is the HDR scene, the first HDR scene determination result indicates that the current scene is the HDR scene, wherein the current scene is not the HDR scene, when the first adaptive dynamic range compression gain, the first dark area luma information, and the first ambient luma satisfy the HDR scene exit condition, wherein when the current scene is not the HDR scene, the first HDR scene determination result indicates that the current scene is not the HDR scene, wherein when the first adaptive dynamic range compression gain, the first dark area luma information, and the first ambient luma satisfy neither the HDR scene entry condition nor the HDR scene exit condition, the first HDR scene determination result is consistent with a previous HDR scene determination result, wherein the HDR scene entry condition comprises:

either a) the first adaptive dynamic range compression gain being greater than a gain threshold Z1 or b) the first dark area luma information being less than a dark area luma threshold A1; and the first ambient luma being greater than an ambient luma threshold H1, wherein the HDR scene exit condition comprises:

either c) the first adaptive dynamic range compression gain being less than a gain threshold Z2 or d) the first dark area luma information being greater than a dark area luma threshold A2; and the first ambient luma being less than an ambient luma threshold H2, and wherein Z1 is greater than Z2, A1 is less than A2, and H1 is greater than H2.

5. The method of claim 1, wherein the second user interface comprises a first control, and after displaying the second user interface, the method further comprises:

loading, in response to an operation on the first control, configuration parameters of a plurality of image readout modes corresponding to a second camera mode, wherein the plurality of image readout modes comprises a third image readout mode; and displaying a third user interface of the camera application, wherein the third user interface comprises a third preview window, and the third preview window comprises a third preview image captured by the electronic device based on the third image readout mode.

6. The method of claim 1, wherein loading the first configuration parameter and the second configuration parameter comprises loading, in response to an operation of converting the camera application from a background running state to a foreground running state, configuration parameters of a plurality of image readout modes corresponding to the first camera mode, wherein the first camera mode is a camera mode used a last time before the camera application is converted to the foreground running state, and wherein the plurality of image readout modes comprise the first image readout mode and the second image readout mode.

7. The method of claim 6, wherein the first image readout mode is a default image readout mode in the first camera mode, or wherein the first image readout mode is an image readout mode used the last time before the camera application is converted to the foreground running state.

8. The method of claim 1, further comprising loading, when the electronic device enters the first camera mode of the camera application, a configuration parameter of at least one image readout mode other than the first image readout mode and the second image readout mode.

9. The method of claim 1, wherein displaying the first user interface comprises:

displaying the first user interface of the camera application after the first configuration parameter is loaded and before the second configuration parameter is loaded; or displaying the first user interface of the camera application after the second configuration parameter is loaded.

10. The method of claim 1, wherein the quantity of the register sequences in the third configuration parameter is less than a quantity of register sequences in the first configuration parameter.

11. The method of claim 2, wherein obtaining the first HDR scene determination result comprises:

sending, by an automatic exposure control module of the electronic device, a first adaptive dynamic range compression gain, a first dark area luma information, and a first ambient luma to a perception engine of the electronic device, wherein the first adaptive dynamic range compression gain, first dark area luma information, and first ambient luma are based on the luma information of the first preview image; and obtaining, by the perception engine, the first HDR scene determination result, wherein whether the current scene is the HDR scene is based on the first adaptive dynamic range compression gain, the first dark area luma information, and the first ambient luma.

12. The method of claim 10, wherein loading the third configuration parameter comprises:

sending, by a sensor node module in the electronic device, the third configuration parameter to a camera in the electronic device, wherein the third configuration parameter is determined when a target image readout mode is the second image readout mode; and switching, by the camera based on the third configuration parameter, a configuration parameter of a currently applied image readout mode from the first configuration parameter to the second configuration parameter.

13. An electronic device, comprising:

one or more processors; and one or more memories coupled to the one or more processors and configured to store instructions that, when executed by the one or more processors, cause the electronic device to be configured to:

load a first configuration parameter of a first image readout mode and a second configuration parameter of a second image readout mode when the electronic device enters a first camera mode of a camera application;

display a first user interface of the camera application, wherein the first user interface comprises a first preview window, and the first preview window comprises a first preview image captured by the electronic device based on the first image readout mode;

load a third configuration parameter for switching between image readout modes when a switching condition for switching from the first image readout mode to the second image readout mode is satisfied, wherein the third configuration parameter is configured to instruct to switch from the first image readout mode to the second image readout mode, and a quantity of register sequences in the third configuration parameter is less than a quantity of register sequences in the second configuration parameter; and display a second user interface of the camera application, wherein the second user interface comprises a second preview window, and the second preview window comprises a second preview image captured by the electronic device based on the second image readout mode.

14. The electronic device of claim 13, wherein before loading the third configuration parameter, the electronic device is further configured to:

obtain a first high dynamic range (HDR) scene determination result, based on luma information of the first preview image, of whether a current scene is an HDR scene; and search, based on a correspondence among a camera mode, an HDR scene determination result, and an image readout mode, for an image readout mode corresponding to the first camera mode and the first HDR scene determination result, wherein a found image readout mode is a target image readout mode, wherein satisfying the switching condition for switching from the first image readout mode to the second image readout mode comprises the target image readout mode being the second image readout mode.

15. The electronic device of claim 13, wherein before loading the third configuration parameter, the electronic device is further configured to:

obtain a first high dynamic range (HDR) scene determination result, based on luma information of the first preview image, of whether a current scene is an HDR scene; and search, based on a correspondence among a camera mode, a zoom ratio, an HDR scene determination result, and an image readout mode, for an image readout mode corresponding to the first camera mode, a current zoom ratio, and the first HDR scene determination result, wherein a found image readout mode is a target image readout mode, wherein satisfying the switching condition for switching from the first image readout mode to the second image readout mode comprises the target image readout mode being the second image readout mode.

16. The electronic device of claim 14, wherein whether an HDR scene entry condition is satisfied is based on a first adaptive dynamic range compression gain, first dark area luma information, and first ambient luma based on the luma information of the first preview image, and wherein whether an HDR scene exit condition is satisfied is based on the first adaptive dynamic range compression gain, the first dark area luma information, and the first ambient luma, wherein the current scene is the HDR scene when the first adaptive dynamic range compression gain, the first dark area luma information, and the first ambient luma satisfy the HDR scene entry condition, wherein when the current scene is the HDR scene, the first HDR scene determination result indicates that the current scene is the HDR scene, wherein the current scene is not the HDR scene when the first adaptive dynamic range compression gain, the first dark area luma information, and the first ambient luma satisfy the HDR scene exit condition, wherein when the current scene is not the HDR scene, the first HDR scene determination result indicates that the current scene is not the HDR scene, wherein when the first adaptive dynamic range compression gain, the first dark area luma information, and the first ambient luma satisfy neither the HDR scene entry condition nor the HDR scene exit condition, the first HDR scene determination result is consistent with a previous HDR scene determination result, wherein the HDR scene entry condition comprises:

either a) the first adaptive dynamic range compression gain being greater than a gain threshold Z1 or b) the first dark area luma information being less than a dark area luma threshold A1; and the first ambient luma being greater than an ambient luma threshold H1, wherein the HDR scene exit condition comprises:

either c) the first adaptive dynamic range compression gain being less than a gain threshold Z2 or d) the first dark area luma information being greater than a dark area luma threshold A2; and the first ambient luma being less than an ambient luma threshold H2, and wherein Z1 is greater than Z2, A1 is less than A2, and H1 is greater than H2.

17. A non-transitory computer-readable storage medium storing instructions that, when executed by one or more processors of an electronic device, cause the electronic device to be configured to:

load a first configuration parameter of a first image readout mode and a second configuration parameter of a second image readout mode when the electronic device enters a first camera mode of a camera application;

display a first user interface of the camera application, wherein the first user interface comprises a first preview window, and the first preview window comprises a first preview image captured by the electronic device based on the first image readout mode;

load a third configuration parameter for switching between image readout modes when a switching condition for switching from the first image readout mode to the second image readout mode is satisfied, wherein the third configuration parameter is configured to instruct to switch from the first image readout mode to the second image readout mode, and a quantity of register sequences in the third configuration parameter is less than a quantity of register sequences in the second configuration parameter; and display a second user interface of the camera application, wherein the second user interface comprises a second preview window, and the second preview window comprises a second preview image captured by the electronic device based on the second image readout mode.

18. The non-transitory computer-readable storage medium of claim 17, wherein before loading the third configuration parameter, the electronic device is further configured to:

obtain a first high dynamic range (HDR) scene determination result, based on luma information of the first preview image, of whether a current scene is an HDR scene; and search, based on a correspondence among a camera mode, an HDR scene determination result, and an image readout mode, for an image readout mode corresponding to the first camera mode and the first HDR scene determination result, wherein a found image readout mode is a target image readout mode, wherein satisfying the switching condition for switching from the first image readout mode to the second image readout mode comprises the target image readout mode being the second image readout mode.

19. The non-transitory computer-readable storage medium of claim 17, wherein before loading the third configuration parameter, the electronic device is further configured to:

obtain a first high dynamic range (HDR) scene determination result, based on luma information of the first preview image, of whether a current scene is an HDR scene; and search, based on a correspondence among a camera mode, a zoom ratio, an HDR scene determination result, and an image readout mode, for an image readout mode corresponding to the first camera mode, a current zoom ratio, and the first HDR scene determination result, wherein a found image readout mode is a target image readout mode, wherein satisfying the switching condition for switching from the first image readout mode to the second image readout mode comprises the target image readout mode being the second image readout mode.

20. The non-transitory computer-readable storage medium of claim 18, wherein whether an HDR scene entry condition is satisfied is based on a first adaptive dynamic range compression gain, first dark area luma information, and first ambient luma based on the luma information of the first preview image, and wherein whether an HDR scene exit condition is satisfied is based on the first adaptive dynamic range compression gain, the first dark area luma information, and the first ambient luma, wherein the current scene is the HDR scene when the first adaptive dynamic range compression gain, the first dark area luma information, and the first ambient luma satisfy the HDR scene entry condition, wherein when the current scene is the HDR scene, the first HDR scene determination result indicates that the current scene is the HDR scene, wherein the current scene is not the HDR scene when the first adaptive dynamic range compression gain, the first dark area luma information, and the first ambient luma satisfy the HDR scene exit condition, wherein when the current scene is not the HDR scene, the first HDR scene determination result indicates that the current scene is not the HDR scene, wherein when the first adaptive dynamic range compression gain, the first dark area luma information, and the first ambient luma satisfy neither the HDR scene entry condition nor the HDR scene exit condition, the first HDR scene determination result is consistent with a previous HDR scene determination result, wherein the HDR scene entry condition comprises:

either a) the first adaptive dynamic range compression gain being greater than a gain threshold Z1 or b) the first dark area luma information being less than a dark area luma threshold A1; and the first ambient luma being greater than an ambient luma threshold H1, wherein the HDR scene exit condition comprises:

either c) the first adaptive dynamic range compression gain being less than a gain threshold Z2 or d) the first dark area luma information being greater than a dark area luma threshold A2; and the first ambient luma being less than an ambient luma threshold H2, and wherein Z1 is greater than Z2, A1 is less than A2, and H1 is greater than H2.

* * * * *